(12) United States Patent
Nukariya et al.

(10) Patent No.: US 10,599,472 B2
(45) Date of Patent: Mar. 24, 2020

(54) INFORMATION PROCESSING APPARATUS, STAGE-OUT PROCESSING METHOD AND RECORDING MEDIUM RECORDING JOB MANAGEMENT PROGRAM

(71) Applicant: FUJITSU LIMITED, Kawasaki-shi, Kanagawa (JP)

(72) Inventors: Atsushi Nukariya, Kawagoe (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 15/898,274

(22) Filed: Feb. 16, 2018

(65) Prior Publication Data
US 2018/0267831 A1    Sep. 20, 2018

(30) Foreign Application Priority Data
Mar. 15, 2017    (JP) ................................ 2017-050025

(51) Int. Cl.
*G06F 9/48*    (2006.01)
*G06F 9/50*    (2006.01)
(Continued)

(52) U.S. Cl.
CPC ............ *G06F 9/4881* (2013.01); *G06F 9/505* (2013.01); *G06F 9/5044* (2013.01);
(Continued)

(58) Field of Classification Search
None
See application file for complete search history.

(56) References Cited

U.S. PATENT DOCUMENTS

| 2008/0016508 | A1  | 1/2008 | Goto et al. |
| 2012/0233486 | A1* | 9/2012 | Phull ................ G06F 9/5083 713/375 |
| 2018/0246765 | A1* | 8/2018 | Chen ................ G06F 9/4881 |

FOREIGN PATENT DOCUMENTS

| JP | 60-157642   | 8/1985 |
| JP | 2011-186810 | 9/2011 |
| WO | 2006-100752 | 9/2006 |

OTHER PUBLICATIONS

[Online] Internet Search Jan. 12, 2017, Retrieved from the Internet <http://www.cc.u-tokyo.ac.jp/system/fx10/fx10-tebiki/chapter8.html> 2016, Supercomputing Division, Information Technology Center The University of Tokyo, (26 pages), with partial English translation.

(Continued)

*Primary Examiner* — Wynuel S Aquino
(74) *Attorney, Agent, or Firm* — Fujitsu Patent Center

(57) ABSTRACT

An information processing apparatus includes: a processor performs a scheduling process of scheduling a job for nodes and including: calculating, when one node executes a first job, a job execution end time when execution of the first job is completed by referring an execution history in which an execution time of a job is recorded; acquiring, from a load management node that manages a load of a metadata-process execution node which performing metadata processing to access metadata of a file among the nodes, the load of the metadata-process execution node at the job execution end time; and generating, when the load is equal to or more than a threshold, schedule data to cause a staging execution node which performs the metadata processing produced by staging, at the job execution end time, the metadata processing based on staging to a file having an execution result of the first job.

20 Claims, 19 Drawing Sheets

(51) Int. Cl.
*G06F 16/11* (2019.01)
*G06F 16/10* (2019.01)

(52) U.S. Cl.
CPC ............ *G06F 9/5083* (2013.01); *G06F 16/10* (2019.01); *G06F 16/122* (2019.01)

(56) References Cited

OTHER PUBLICATIONS

Sakai et al., [online] Internet Search Jan. 12, 2017, Retrieved from the internet <http://img.jp.fujitsu.com/downloads/jp/jmag/vol63-3/paper08.pdf> "High-Performance and Highly Reliable File System for the K computer", Fujitsu. 63, 3, p. 280-286, May 2012 (7 pages), with English Abstract.

[Online] Internet Search Jan. 12, 2017, Retrieved from the Internet <http://super.para.media.kyoto-u.ac.jp/xcrypt/docs/file_stager-ja.pdf> E-science Group, Nakashima Lab., ACCMS, Kyoto Univ. 2011, (14 pages), with partial English translation.

* cited by examiner

FIG. 6

JOB-RESOURCES RESERVATION MANAGEMENT TABLE ~521

| JOB ID | JOB NAME | PROCESSOR START-OF-USE TIME | PROCESSOR GROUP MANAGEMENT STRUCTURE | PROCESSOR END-OF-USE TIME |
|---|---|---|---|---|
| 135 | Job A | 11/15 15:00 | 0-15, 32-63 | 15:50 |
| 138 | Job B | 11/15 15:20 | 16-31 | 15:50 |
| 141 | Job C | 11/15 15:50 | 0-63 | 17:50 |

STAGING SCHEDULE TABLE ~522

| JOB ID | FILE ID | FILE SIZE | STAGE-OUT SCHEDULED TIME | STAGE-OUT SCHEDULED PERIOD | ID OF NODE PERFORMING STAGING | |
|---|---|---|---|---|---|---|
| 135 | 7639 | 178,110 | 11/15 15:40 | 00:09 | mstg_svr | ~701_1 |
|  | 7642 | 900 | 11/15 15:40 | 00:02 | sstg_svr_00 | ~701_2 |
|  | 7700 | 1,271 | 11/15 15:40 | 00:06 | sstg_svr_00 | ~701_3 |
| 138 | 8629 | 32,810 | 11/15 15:45 | 00:04 | sstg_svr_01 | ~702 |
| 141 | 8902 | 67,372 | 11/15 17:45 | 00:02 | sstg_svr_00 | ~703 |

FIG. 11

| ID | CPU USAGE RATIO | DISK I/O AMOUNT | |
|---|---|---|---|
| mds_00 | 13.0[%] | 1505[ops] | ~1101 |
| mds_01 | 23.5[%] | 3300[ops] | ~1102 |
| mds_02 | 8.0[%] | 612[ops] | ~1103 |

META DATA-SERVER LOAD MANAGEMENT TABLE ~523

FIG. 12

| STAGING-BUFFER-SERVER LOAD MANAGEMENT TABLE | | | ~524 |
|---|---|---|---|
| ID | CPU USAGE RATIO | META ACCESS COUNT | |
| sstg_svr_00 | 3.0[%] | 813[ops] | ~1201 |
| sstg_svr_01 | 15.5[%] | 4020[ops] | ~1202 |
| sstg_svr_02 | 21.0[%] | 5902[ops] | ~1203 |

FIG. 13

| JOB ID | JOB NAME | JOB START DATE AND TIME | JOB END DATE AND TIME | THE NUMBER OF UTILIZED PROCESSORS | FILE ID | STAGE-OUT START DATE AND TIME | STAGE-OUT END DATE AND TIME | STAGE-OUT METADATA ACCESS COUNT |
|---|---|---|---|---|---|---|---|---|
| 11 | Job A | 11/10 11:35 | 11/10 12:25 | 48 | 7639 | 11/10 12:15 | 11/10 12:24 | 3 |
|  |  |  |  |  | 7642 | 11/10 12:15 | 11/10 12:17 |  |
|  |  |  |  |  | 7700 | 11/10 12:15 | 11/10 12:21 |  |
| 12 | Job B | 11/10 11:55 | 11/10 12:25 | 16 | 8629 | 11/10 12:15 | 11/10 12:19 | 1 |
| 13 | Job B | 11/10 12:25 | 11/10 12:55 | 16 | 8629 | 11/10 12:45 | 11/10 12:49 | 1 |

PAST-JOB INFORMATION DB 525

| STAGING BUFFER SERVER ID | CPU USAGE RATIO | |
|---|---|---|
| sstg_svr_00 | 65.1% | ~1501 |
| sstg_svr_01 | 76.6% | ~1502 |
| sstg_svr_02 | 55.8% | ~1503 |

FIG. 16

| CPU USAGE RATIO | META ACCESS COUNT |
|---|---|
| 3.0[%] | 813[ops] |

FIG. 17

| TIME | mds_00 | mds_01 | |
|---|---|---|---|
| 12:00-12:01 | 77.91% | 83.11% | ~1701 |
| 12:01-12:02 | 61.80% | 73.18% | ~1702 |
| 12:02-12:03 | 68.28% | 60.12% | ~1703 |
| 12:04-12:05 | 25.00% | 48.18% | ~1704 |

FIG. 19

| STAGING-METADATA-UPDATE-ORDER RESTRICTION MANAGEMENT TABLE ~526 |  |  |
|---|---|---|
| JOB ID | DEPENDENT JOB | |
| 12 | 8 | ~1901 |
| 16 | 12, 15 | ~1902 |
| 25 | 18 | ~1903 |
| 29 | 22 | ~1904 |

INFORMATION PROCESSING APPARATUS, STAGE-OUT PROCESSING METHOD AND RECORDING MEDIUM RECORDING JOB MANAGEMENT PROGRAM

CROSS-REFERENCE TO RELATED APPLICATION

This application is based upon and claims the benefit of priority of the prior Japanese Patent Application No. 2017-050025, filed on Mar. 15, 2017, the entire contents of which are incorporated herein by reference.

FIELD

The embodiment discussed herein is related to an information processing apparatus, a stage-out processing method, and a recording medium on which a job management program is recorded.

BACKGROUND

A file system manages files by separating actual data of the files from metadata used for file management.

The related art is disclosed in Japanese Laid-open Patent Publication No. 2011-186810, International Publication Pamphlet No. WO 2006100752, or Japanese Laid-open Patent Publication No. 60-157642.

SUMMARY

According to an aspect of the embodiments, an information processing apparatus includes: a processor; and a memory coupled to the processor, wherein the processor performs a scheduling process of scheduling a job for a plurality of nodes included in a parallel processing apparatus, the scheduling process including: calculating, when one of the plurality of nodes executes a first job, a job execution end time when execution of the first job is completed by referring an execution history in which an execution time of a job is recorded; acquiring, from a load management node that manages a load of a metadata-process execution node which performing metadata processing to access metadata of a file among the plurality of nodes, the load of the metadata-process execution node at the job execution end time; and generating, when the load is equal to or more than a threshold, schedule data to cause a staging execution node which performs the metadata processing produced by staging in which a file is moved between two storage areas to perform, at the job execution end time, the metadata processing based on staging to a file having an execution result of the first job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an exemplary job-resources reservation management table;

FIG. 7 is a diagram illustrating an exemplary staging schedule table;

FIG. 11 is a diagram illustrating an exemplary metadata-server load management table;

FIG. 12 is a diagram illustrating an exemplary staging-buffer-server load management table;

FIG. 13 is a diagram illustrating exemplary past-job information;

FIG. 15 is a diagram illustrating exemplary CPU usage ratios produced in staging buffer servers;

FIG. 16 is a diagram illustrating an exemplary staging-buffer-server load state;

FIG. 17 is a diagram illustrating exemplary CPU usage ratios of metadata servers at each time;

FIG. 19 is a diagram illustrating an exemplary staging-metadata-update-order restriction management table.

DESCRIPTION OF EMBODIMENT

For example, in staging, to increase the speed of file access during execution of a job, files are moved between two storage areas having different access performances, before and after execution of the job.

For example, in the case where immediate transfer is unnecessary or where the load of a service providing apparatus is high, a service request is temporarily accumulated in a queue. When the load of the providing apparatus is decreased, a request which is given the highest priority and for which an allowable delay is small is transferred from the queue to the providing apparatus. When, after input of a job, the usage ratio of a central processing unit (CPU) or the like is increased and the execution speed of the input job is decreased, a node table, a job management table, and a job class table are referred to, and the job is input again from the currently-operating node to a different node. A work file corresponding to a file to be used by the job in execution of the job is created. When write of information, which has been transferred from the different node, to the work file is completed, the information in the work file is copied into a file specified in the job. Then, the work file is deleted.

For example, the load of a metadata-process execution node which performs metadata processing in which metadata is accessed may not be maintained at a proper ratio or less to the throughput of the metadata-process execution node. For example, in a file system in which staging is performed, the load of a metadata-process execution node increases at timings before and after execution of a job when staging occurs. The timings before and after execution of a job depend on the job scheduling. Therefore, in principle, it may be impossible for the file system to control an increase in the load. In scheduling a job, the number of computation nodes that perform the job, and information about how the computation nodes that perform the job are arranged on a network are important. Therefore, employment of job scheduling that causes the load of a metadata-process execution node to be maintained at the proper ratio or less to the throughput of the metadata-process execution node may be inappropriate.

For example, there may be provided a parallel processing apparatus which facilitates maintaining the load of a metadata-process execution node, which performs metadata processing in which metadata is accessed, at a proper ratio or less to the throughput of the metadata-process execution node.

Figure 1:
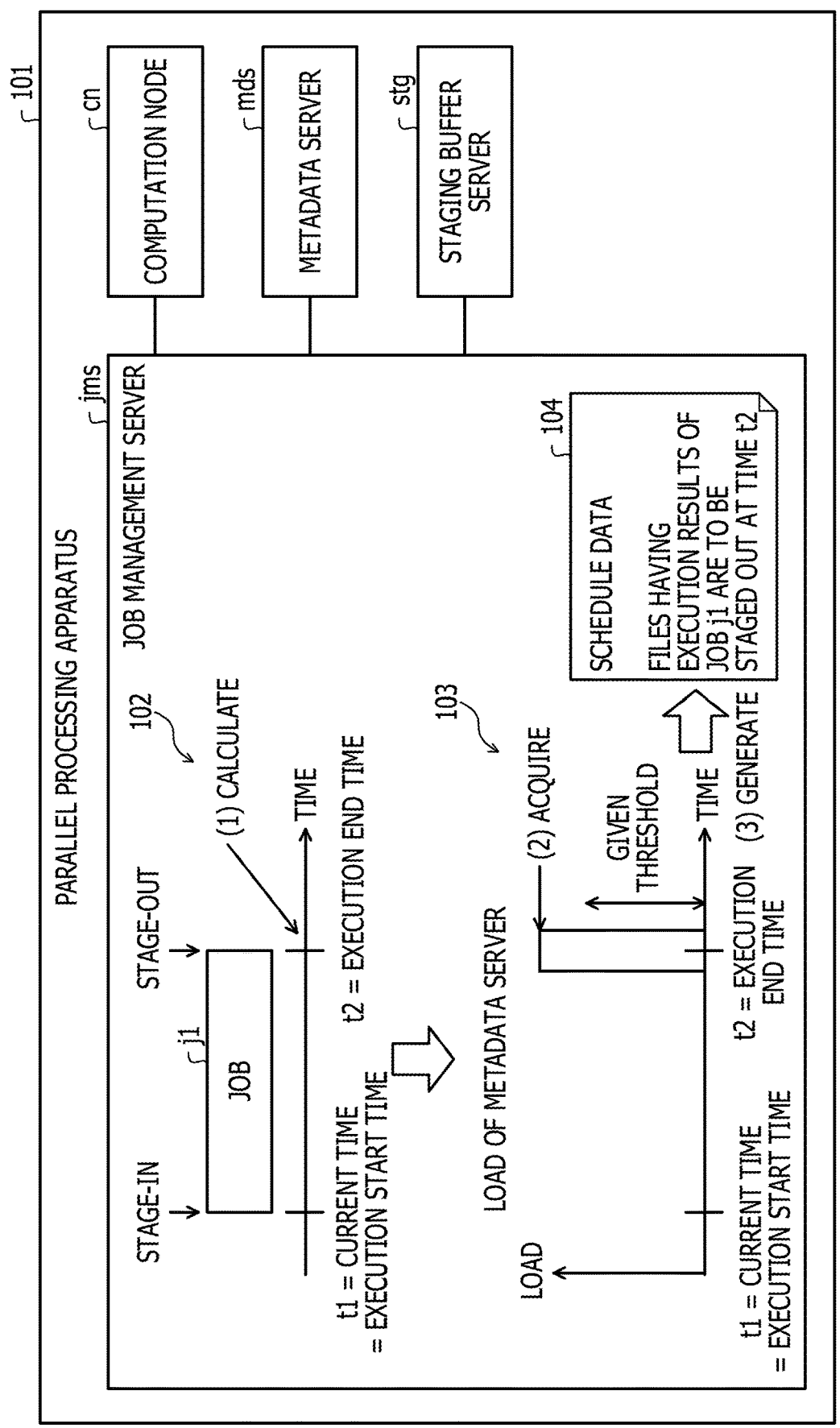
FIG. 1 is a diagram illustrating an exemplary operation of a parallel processing apparatus.

FIG. 1 illustrates an exemplary operation of a parallel processing apparatus. A parallel processing apparatus 101 is a parallel processing apparatus system including multiple nodes. Each of the multiple nodes has a processor and a memory. A computation node among the multiple nodes performs a job such as scientific calculation.

A large-scale parallel processing apparatus system may have a function called "staging". Staging indicates a function of transferring any file between a user disk and a work disk on a computation node before and after execution of a job. An operation of moving a file between two storage areas is hereinafter called "staging". In many cases, staging is performed as a part of a batch job scheduler or as a part of middleware playing a role of assisting a batch job scheduler.

A user disk is a secondary storage area of which the owner is a user or a user group who performs a job, or a secondary storage area in which files given access right that is consistent before and after execution of a job are disposed. A work disk is a secondary storage area that may be temporarily used only during execution of a job. Transfer from a user disk to a work disk on a computation node is called "stage-in", and transfer from a work disk on a computation node to a user disk is called "stage-out". "Staging" is hereinafter a generic term of stage-in and stage-out.

For example, a user disk in a large-scale parallel processing apparatus system is a disk managed in a centralized manner for the entire parallel processing apparatus system by using a parallel distributed file system program provided for a large-scale configuration. A work disk in a large-scale parallel processing apparatus system is a hard disk or a solid state drive (SSD) which is connected to a corresponding computation node, or is a disk managed by a network file system shared only among a relatively small number of computation nodes, not among the computation nodes in the entire system. A state in which a file system has a hierarchy may be called "forming a file system with two hierarchical levels".

For example, before start of execution of a job, files to be referred to or updated by the job are copied from a user disk to a work disk as a stage-in operation. After execution of the job, as a stage-out operation, files having been updated by the job and files that have been newly created by the job and that are to be stored are copied from the work disk to the user disk. The object of stage-in and stage-out operations is to use a work disk as a cache so that the speed of file access during execution of a job is increased.

A bottleneck of performance of a parallel distributed file system designed for a large-scale configuration is produced in the following case. An input/output (I/O) process on management information of files, each of which has a small amount of data, may cause a more serious bottleneck than an I/O process on the contents of a file having a large amount of data. Management information is called hereinafter called "metadata". Metadata encompasses, for example, a file size, a file attribute, file permission, and a file access time.

The reason why the I/O process on metadata causes a serious bottleneck is as follows. A bottleneck produced from an I/O process on the contents of a file may be relatively easily addressed by using additional servers or disks for storing data. In contrast, in an I/O process on metadata, a ratio of processes that are to be performed only in series is relatively high because the consistency of management information in a file system is to be maintained. In the description below, a node, among the multiple nodes, that performs metadata processing in which metadata is accessed is called a "metadata server".

A case in which it is not possible to maintain the load of a metadata server at a proper ratio to the throughput of the metadata server may occur. For example, in a file system in which staging is performed, the load of a metadata server increases at timings before and after execution of a job when staging occurs. The timings before and after execution of a job depend on the job scheduling. Therefore, in principle, control on the file system side may be an impossible factor. In scheduling a job, the number of computation nodes, and information about how the computation nodes are arranged on a network are important. Therefore, employment of job scheduling which causes the load of a metadata server to be maintained at a proper ratio to the throughput of the metadata server may be inappropriate.

For example, in the entire parallel file system, it is difficult to individually control which subtree receives a large amount of access to metadata at which time point. Therefore, in avoidance of access concentration to a specific metadata server at a specific time point, a serious problem may occur.

For example, a staging execution node which performs metadata processing caused by staging is prepared. The staging execution node is hereinafter called a "staging buffer server". In addition, metadata processing caused by staging is called a "staging process". The staging process, for example, updates the size and an access time of a file that is to be staged.

A stage-out operation is performed as follows. The execution end time of a job is obtained from a job execution history. When the load of a metadata server at the obtained time is high, a staging buffer server is made to perform a stage-out operation at the obtained time. Similarly, a stage-in operation is performed as follows. The execution start time of a job is obtained from the scheduling result of the job. When the load of a metadata server at the obtained time is high, a staging buffer server is made to perform a stage-in operation at the obtained time. Thus, the parallel processing apparatus 101 finds a time at which the load concentration on a metadata server mds is likely to occur, enabling the load of the metadata server mds to be suppressed.

The parallel processing apparatus 101 includes a job management server jms, a computation node cn, the metadata server mds, and a staging buffer server stg serving as a staging process execution node, which are specific nodes that perform a job scheduling process. In FIG. 1, at a time when a stage-out operation occurs, achieving the state in which the load of the metadata server mds is maintained at a proper ratio or less to the throughput of the metadata server mds is tried.

When any of the multiple nodes is to do a first job, the job management server jms refers to an execution history in which job execution periods are recorded, and calculates the execution end time at which execution of the first job will be completed. A node that does the first job is the computation node cn. In FIG. 1, a time of completion of execution of a job is regarded as a time of occurrence of a stage-out operation. To correctly calculate a time of occurrence of a stage-out operation, for example, the execution history may have information about a period from start of execution of a job to occurrence of a stage-out operation.

In calculation of the execution end time, for example, the job management server jms refers to the execution history when the first job is to be done, and detects the number of processors that will be used by the first job and the job execution period for which the job name matches the name of the first job. The job management server jms calculates, as the execution end time, a time obtained by adding the detected execution period to the current time. Even before execution of the first job, the execution end time may be calculated. For example, as described above, the job management server jms refers to the execution history, detects the execution period, obtains the execution start time of the first job from the job scheduling result, and calculates, as the execution end time, a time obtained by adding the detected execution period to the obtained execution start time.

A graph 102 illustrated in FIG. 1 indicates a job j1's execution period obtained by referring to the execution history. The horizontal axis of the graph 102 represents time. The graph 102 describes that, at time t1 which is the current time, execution of the job j1 starts and a stage-in operation occurs, and that, at time t2, the execution of the job j1 ends. Therefore, in FIG. 1, as illustrated in (1) in FIG. 1, when the job management server jms is to execute the job j1 as the first job, the job management server jms refers to the execution history to calculate time t2 as the execution end time of the job j1.

Then, the job management server jms obtains the load of the metadata server mds at the calculated execution end time from a load management node which manages the loads of the nodes. The load management node may be any node of the nodes included in the parallel processing apparatus 101. For example, the load management node may be the job management server jms itself, or may be another node. In the description below, it is assumed that the load management node is the job management server jms. The load of the metadata server mds at the execution end time may be the CPU usage ratio or the disk I/O amount of the metadata server mds, or may be both the CPU usage ratio and the disk I/O amount.

The method of obtaining the load of the metadata server mds at the execution end time is performed as follows. The job management server jms has stored load information indicating the metadata server mds' load corresponding to the number of files that are subjected to metadata processing. The job management server jms determines, from the job scheduling result, the number of files that are to be staged out at the execution end time. The job management server jms refers to the load information to obtain the metadata server mds' load corresponding to the determined number of files.

As illustrated in (2) in FIG. 1, the job management server jms obtains the load of the metadata server mds at the execution end time. A graph 103 illustrated in FIG. 1 indicates the obtained load of the metadata server mds.

The job management server jms determines whether or not the obtained load is equal to or more than a given threshold. The given threshold is set by an administrator or the like of the parallel processing apparatus 101. In FIG. 1, it is assumed that the obtained load is equal to or more than the given threshold. In this case, as illustrated in (3) in FIG. 1, the job management server jms generates schedule data 104, according to which, upon completion of execution of the job j1, the staging buffer server stg is made to stage files having execution results of the job j1. The schedule data 104 illustrated in FIG. 1 describes a message, "the files having execution results of the job j1 are to be staged out at time t2".

Thus, when the load of the metadata server mds at the stage-out execution time is equal to or more than the given threshold, the parallel processing apparatus 101 assigns, in advance, the staging buffer server stg to the staging process. Thus, the parallel processing apparatus 101 may facilitate maintaining the load of the metadata server mds at a stage-out execution time, at a proper ratio or less to the throughput of the metadata server mds.

In FIG. 1, a stage-out operation is described. In a similar way, the parallel processing apparatus 101 facilitates maintaining the load of the metadata server mds at a stage-in execution time, at a proper ratio or less to the throughput of the metadata server mds.

Figure 2:
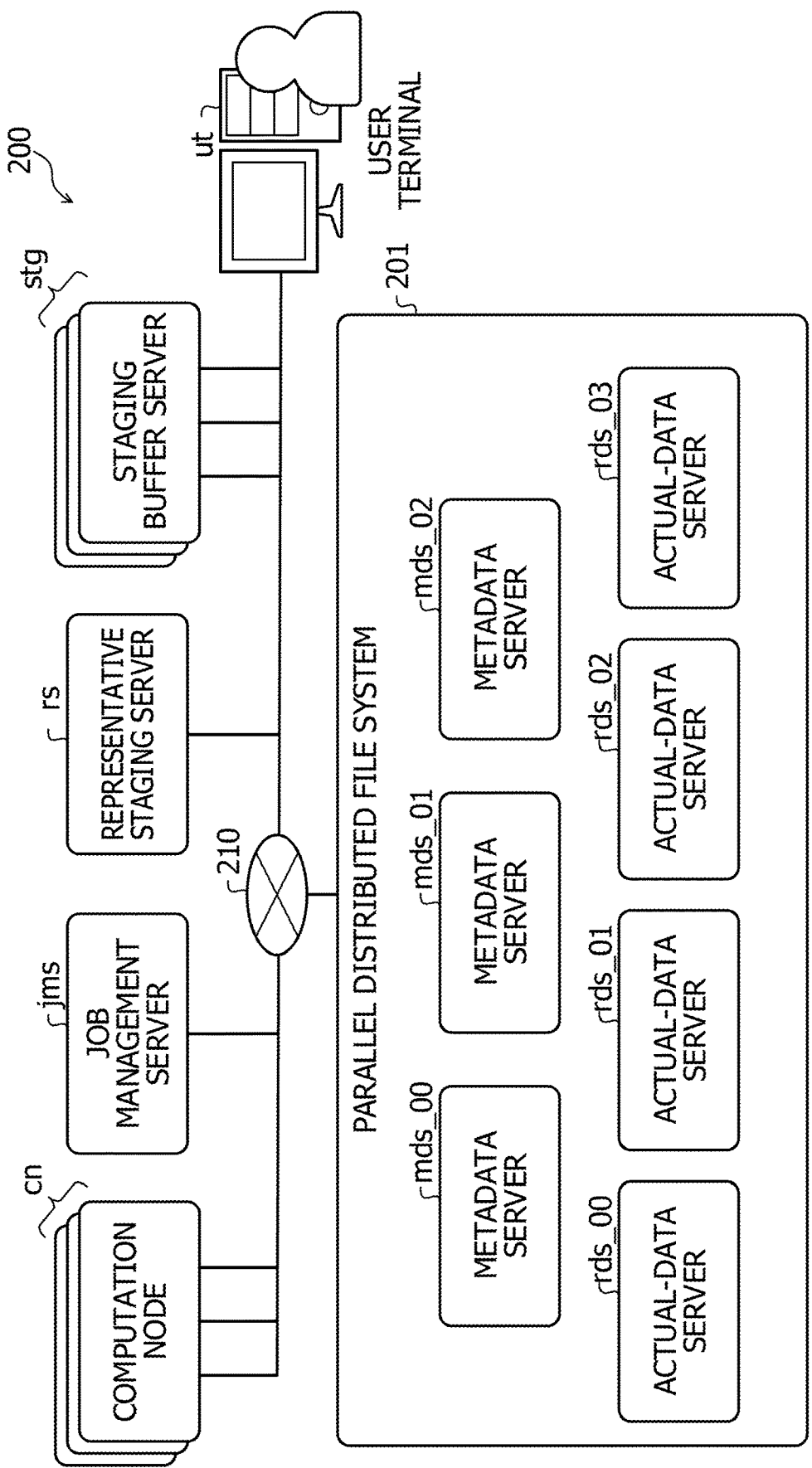
FIG. 2 is a diagram illustrating an exemplary parallel processing system.

FIG. 2 illustrates an exemplary parallel processing system. A parallel processing system 200 includes one or more computation nodes cn, a job management server jms, a representative staging server rs, one or more staging buffer servers stg, a parallel distributed file system 201, and a user terminal ut. The computation node(s) cn, the job management server jms, the representative staging server rs, the staging buffer server(s) stg, the parallel distributed file system 201, and the user terminal ut are connected to one another over a network 210, such as the Internet, a local area network (LAN), or a wide area network (WAN). The parallel distributed file system 201 includes multiple metadata servers mds and multiple actual-data servers rds. In FIG. 2, the parallel distributed file system 201 includes metadata servers mds_00 to mds_02 and actual-data servers rds_00 to rds_03.

In the description below, when components of the same type are differentiated from each other, reference characters, such as "metadata server mds_00" and "metadata server mds_01", are used. When components of the same type are not differentiated from each other, only common characters in reference characters, such as "metadata server mds", may be used.

The computation nodes cn are nodes that execute the applications. The job management server jms is a node that provides a job execution schedule and a staging instruction.

The representative staging server rs is a node that performs a staging process. For example, the representative staging server rs is selected as a representative staging server from the staging buffer servers stg at start of a job operation. The representative staging server rs obtains the loads of the metadata servers mds and the staging buffer servers stg, and responds to a query from the job management server jms. The staging buffer servers stg are nodes that perform the following operations. When the load of a metadata server mds is high, a staging buffer server stg temporarily puts the staging process on hold. When the load of the metadata server mds is decreased, the staging buffer server stg performs the staging process that has been put on hold.

The user terminal ut is a computer operated by a user using the parallel processing system 200. The metadata servers mds are nodes that perform metadata processing on the files. The metadata processing encompasses the staging process. The metadata processing includes, as processes other than the staging process, a process of changing the last access time of a file and a process of changing file access permission. The actual-data servers rds are nodes that perform a file I/O process.

The hardware configuration of a node will be described. The node collectively represents the computation nodes cn, the job management server jms, the representative staging server rs, the staging buffer servers stg, the metadata servers mds, and the actual-data servers rds.

Figure 3:
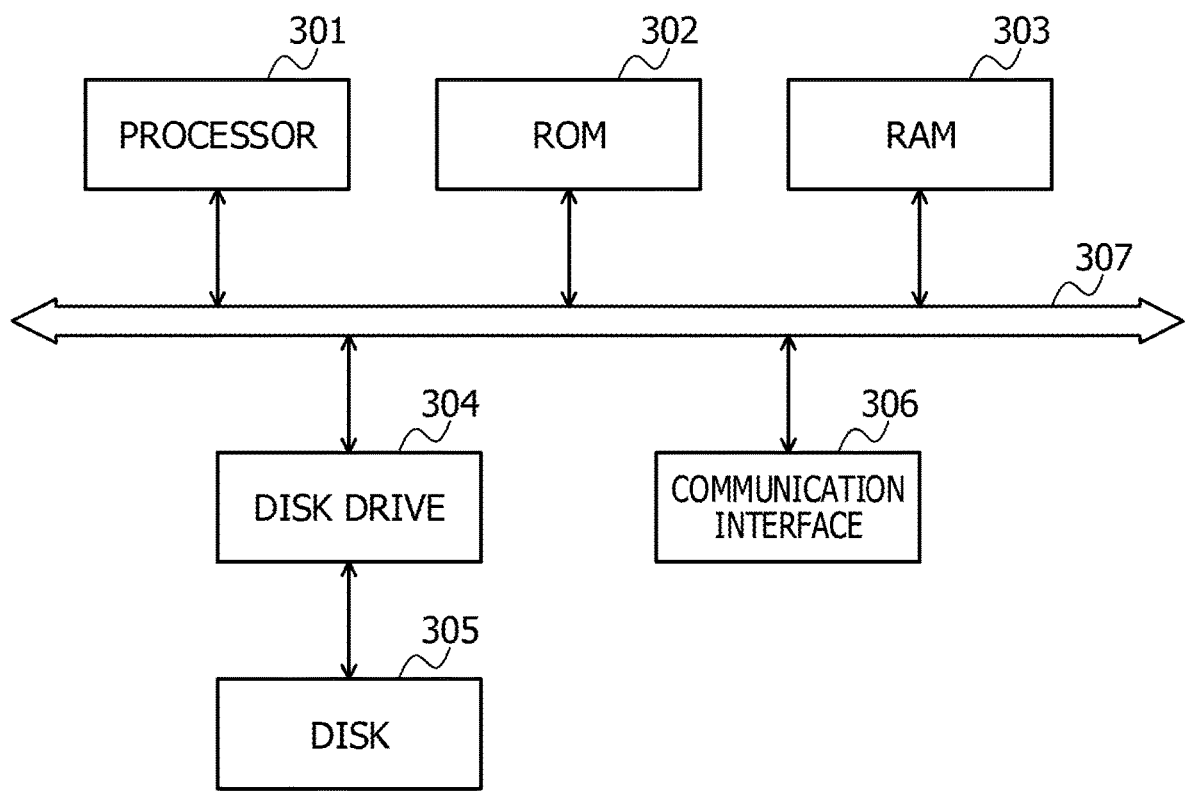
FIG. 3 is a diagram illustrating an exemplary hardware configuration of a node.

FIG. 3 illustrates an exemplary hardware configuration of a node. In FIG. 3, a node includes a processor 301, a read only memory (ROM) 302, and a random access memory (RAM) 303. The node includes a disk drive 304, a disk 305, and a communication interface 306. The processor 301 to the disk drive 304, and the communication interface 306 are connected to one another through a bus 307.

The processor 301 is an arithmetic processing unit which controls the entire node. The node may include multiple processors. The processor 301 is, for example, a CPU. The ROM 302 is a nonvolatile memory used to store programs such as a boot program. The RAM 303 is a volatile memory used as a work area of the processor 301.

The disk drive 304 is a control device that controls read and write of data on the disk 305 in accordance with control exerted by the processor 301. As the disk drive 304, for example, a magnetic disk drive, an optical disk drive, or a solid state drive may be employed. The disk 305 is a nonvolatile memory used to store data written under control exerted by the disk drive 304. For example, when the disk drive 304 is a magnetic disk drive, a magnetic disk may be employed as the disk 305. When the disk drive 304 is an optical disk drive, an optical disk may be employed as the disk 305. When the disk drive 304 is a solid state drive, a semiconductor memory formed of a semiconductor device, that is, a so-called a semiconductor disk, may be employed as the disk 305.

The communication interface 306 is a control device that interfaces a network and internal units and that controls input/output of data from other apparatuses. For example, the communication interface 306 is connected to other apparatuses over a network through a communication line. As the communication interface 306, for example, a modem or a LAN adaptor is employed.

In addition to the hardware illustrated in FIG. 3, the user terminal ut includes hardware, such as a display, a keyboard, and a mouse.

Figure 4:
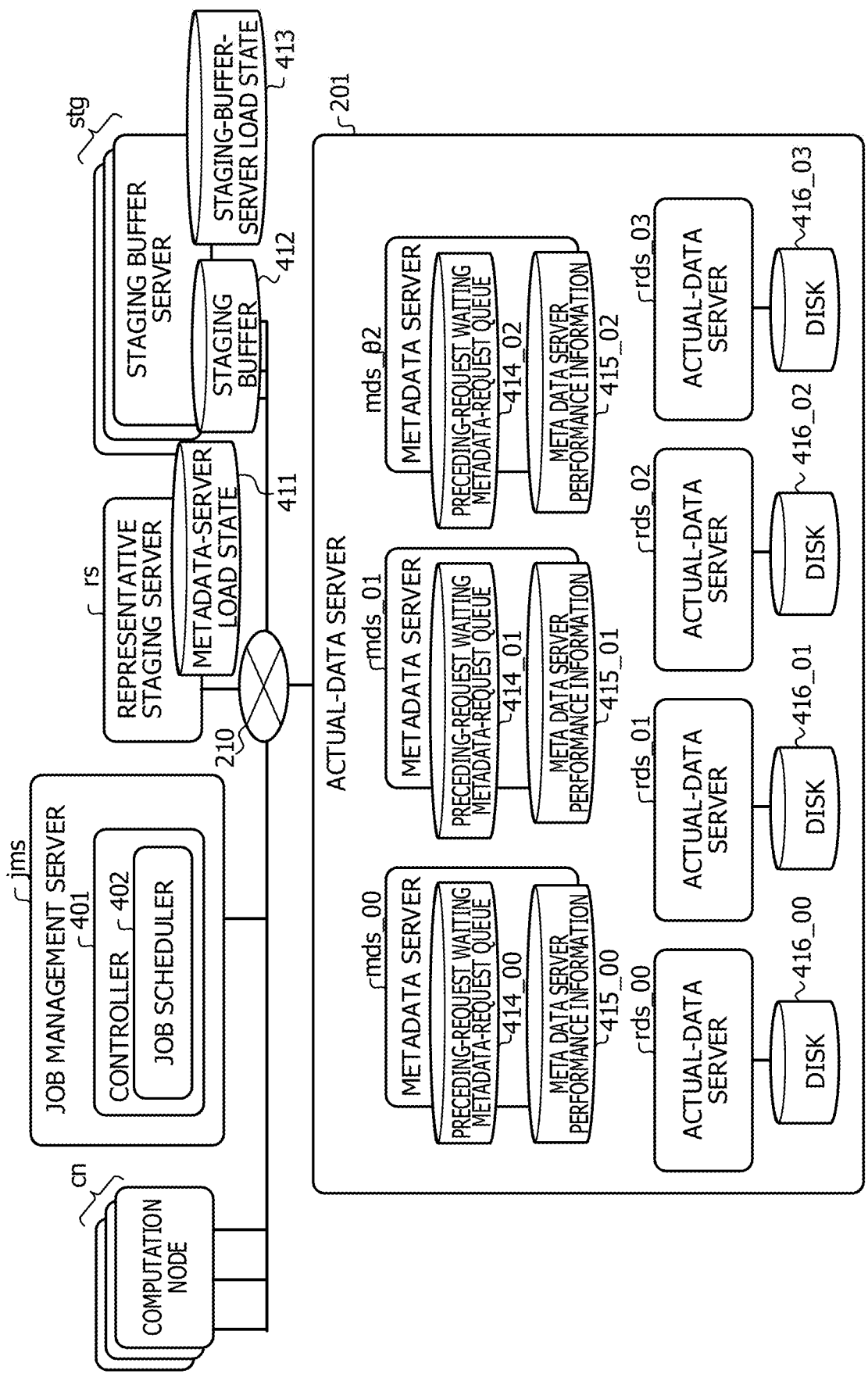
FIG. 4 is a diagram illustrating an exemplary functional configuration of the parallel processing system.

FIG. 4 illustrates an exemplary functional configuration of a parallel processing system. The job management server jms includes a controller 401. The controller 401 includes a job scheduler 402. The processor 301 of the job management server jms executes programs stored in a storage device. Thus, the controller 401 implements the functions of the units. The storage device specifically indicates the ROM 302, the RAM 303, the disk 305, and the like of the job management server jms illustrated in FIG. 3. Processing results of the units are stored in the RAM 303, registers of the processor 301, a cache memory of the processor 301, and the like.

The representative staging server rs has a metadata-server load state 411. Each of the staging buffer servers stg has a staging buffer 412 and a staging-buffer-server load state 413. The metadata-server load state 411 is information indicating the load states of the metadata servers mds. The staging buffer 412 stores metadata requests for staging processes which are put on hold. The staging-buffer-server load state 413 stores the load of the staging buffer server stg.

Each of the metadata servers mds has a preceding-request waiting metadata-request queue 414 and metadata-server performance information 415. The preceding-request waiting metadata-request queue 414 stores metadata requests that continuously wait until completion of metadata processing on the preceding metadata requests that are to be processed in advance. The metadata-server performance information 415 stores the load of the metadata server mds. Each of the actual-data servers rds includes a disk 416.

Figure 5:
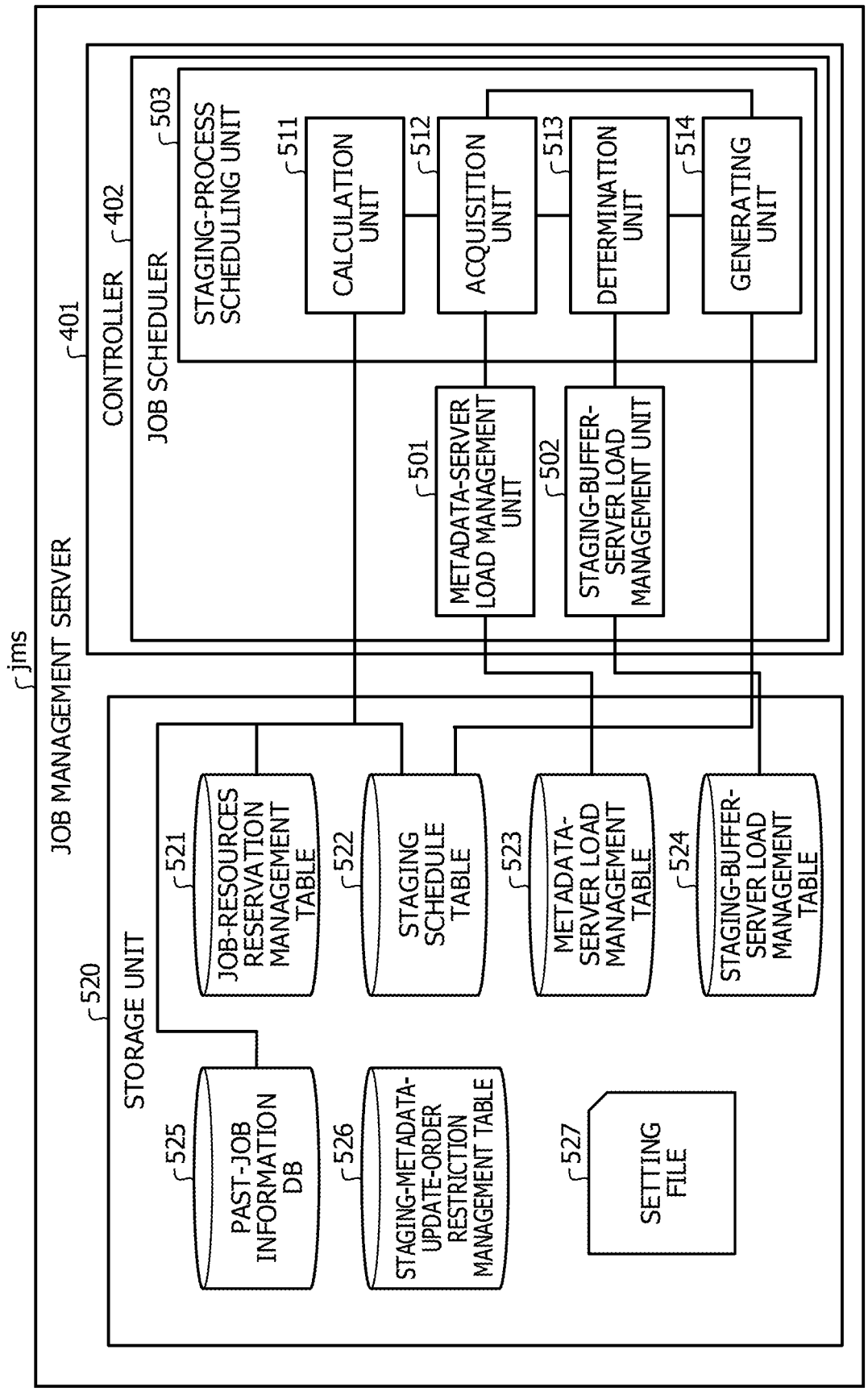
FIG. 5 is a diagram illustrating an exemplary functional configuration of a job management server.

FIG. 5 illustrates an exemplary functional configuration of a job management server. The job scheduler 402 includes a metadata-server load management unit 501, a staging-buffer-server load management unit 502, and a staging-process scheduling unit 503. The staging-process scheduling unit 503 includes a calculation unit 511, an acquisition unit 512, a determination unit 513, and a generating unit 514.

The job management server jms includes a storage unit 520. The storage unit 520 is a storage area, such as the RAM 303 or the disk 305. The storage unit 520 includes a job-resources reservation management table 521, a staging schedule table 522, a metadata-server load management table 523, and a staging-buffer-server load management table 524. The storage unit 520 includes a past-job information DB 525, a staging-metadata-update-order restriction management table 526, and a setting file 527.

The job-resources reservation management table 521 includes information about resources allocated for each job. The staging schedule table 522 includes information about staging of a job. The metadata-server load management table 523 includes the loads of the metadata servers mds. The staging-buffer-server load management table 524 includes the loads of the staging buffer servers stg.

The past-job information DB 525 includes information about jobs that were done in the past. The staging-metadata-update-order restriction management table 526 includes order information indicating the order in which metadata processing is to be performed on files related to jobs. The setting file 527 is a file created by an administrator or the like of the parallel processing system 200 when the parallel processing system 200 is constructed. For example, the setting file 527 includes a list of the identifications (IDs) of the metadata servers mds included in the parallel processing system 200, and a list of the IDs of the staging buffer servers stg.

The metadata-server load management unit 501 is a subcomponent that manages the loads of the metadata servers mds. When multiple metadata servers mds are present, the metadata-server load management unit 501 manages the load of each metadata server mds. The metadata-server load management unit 501 asks a metadata server mds about the load state of the metadata server mds. Then, the metadata-server load management unit 501 calculates the metadata server's load which may be produced at a staging execution time (when the job starts/ends). A series of processes are performed by the metadata-server load management unit 501 when a request is transmitted from the staging-process scheduling unit 503 in response to input of a job.

The staging-buffer-server load management unit 502 is a subcomponent that manages the loads of the staging buffer servers stg. When multiple staging buffer servers stg are present, the staging-buffer-server load management unit 502 manages the load of each staging buffer server stg. The staging-buffer-server load management unit 502 asks a staging buffer server stg about the load state. Then, the stagingbuffer-server load management unit 502 calculates the staging buffer server stg's load which may be produced at a staging execution time. A series of processes are performed by the staging-buffer-server load management unit 502 when a request is transmitted from the staging-process scheduling unit 503 in response to input of a job.

The staging-process scheduling unit 503 is a subcomponent that, when the load of a metadata server mds is high, performs scheduling so that a staging process is assigned to a staging buffer server stg.

For example, in a stage-out operation, the load of a metadata server mds is suppressed. When any of the multiple nodes is to do the first job, the calculation unit 511 refers to the past-job information DB 525 so as to calculate the execution end time of the first job. The past-job information DB 525 corresponds to the execution history in FIG. 1.

The acquisition unit 512 obtains, from the metadata-server load management unit 501, the load of a metadata server mds at the execution end time calculated by the calculation unit 511. In the method of calculating the load of a metadata server mds, for example, the metadata-server load management unit 501 may generate a model expression providing a load with respect to a time, from past changes in the load of the metadata server mds. Then, the metadata-server load management unit 501 inputs the execution end time in the generated model expression so as to calculate the load of the metadata server mds at the execution end time.

When the load obtained by the acquisition unit 512 is equal to or more than the given threshold, the generating unit 514 generates schedule data, according to which, upon completion of execution of the first job, a staging buffer server stg is made to stage files having execution results of the first job. The generated schedule data is stored in the staging schedule table 522.

To calculate a more accurate load, the job management server jms may have the metadata-server load management table 523 as load information indicating the metadata-process execution node's load corresponding to the number of files that are subjected to metadata processing. The acquisition unit 512 refers to the staging schedule table 522 as schedule information indicating a scheduled time at which a corresponding one of the files is staged, and determines the number of files that are to be staged at the execution end time calculated by the calculation unit 511. The acquisition unit 512 transmits the determined number of files to the metadata-server load management unit 501. The metadata-server load management unit 501 transmits, to the acquisition unit 512, the metadata server mds' load which corresponds to the number of files and which is obtained by referring to the metadata-server load management table 523. The acquisition unit 512 obtains the received load of the metadata server mds as the load of the metadata server mds at the execution end time.

The calculation unit 511 may calculate the stage-out scheduled period. In this case, the past-job information DB 525 includes a time at which execution of a job is started, an execution start time at which staging of files having execution results of the job is started, and an execution end time at which the staging of the files is ended. The calculation unit 511 refers to the past-job information DB 525 to calculate the execution start time at which staging of files having execution results of the first job is started and the execution end time at which the staging of the files is ended.

The acquisition unit 512 determines the number of files that are to be staged from the execution start time to the execution end time which are calculated by the calculation unit 511. The acquisition unit 512 transmits, to the metadata-server load management unit 501, the determined number of files and information indicating the period from the execution start time to the execution end time. The metadata-server load management unit 501 transmits, to the acquisition unit 512, the metadata server mds' load per unit time which corresponds to the number of files and which is calculated based on the period. The unit time may be, for example, one second or one minute. The acquisition unit 512 obtains the received metadata server mds' load per unit time as the load of the metadata server mds from the execution start time to the execution end time. When the obtained metadata server mds' load per unit time is equal to or more than a given threshold, the generating unit 514 generates schedule data.

In a stage-in operation, the load of the metadata server mds is suppressed. Before execution of the first job, the calculation unit 511 refers to the staging schedule table 522 to calculate the execution start time of the first job. Before execution of the first job, for example, the first job has been input from the user terminal ut, and the execution start time of the first job has been registered in the staging schedule table 522. The acquisition unit 512 obtains, from the metadata-server load management unit 501, the load of a metadata server mds at the execution start time calculated by the calculation unit 511. When the load obtained by the acquisition unit 512 is equal to or more than the given threshold, the generating unit 514 generates schedule data, according to which, at start of execution of the first job, a staging buffer server stg is made to stage files that are to be referred to or updated by the first job.

As illustrated in FIG. 2, there may be multiple staging buffer servers stg in the parallel processing system 200. Therefore, there may be staging buffer servers stg that are candidate nodes serving as candidates for execution of the staging process. In this case, the staging-process scheduling unit 503 may cause any of the staging buffer servers stg to perform the staging process. For example, when the load obtained by the acquisition unit 512 is equal to or more than the given threshold, the determination unit 513 obtains, from the staging-buffer-server load management unit 502, the load of each staging buffer server stg at the execution end time calculated by the calculation unit 511. The determination unit 513 determines a staging buffer server stg that is to perform the staging process, based on the obtained loads of the staging buffer servers stg.

In execution of metadata processing on files for the first job, the metadata server mds transmits, to the job management server jms, a request to check if preceding metadata processing is to be performed before the metadata processing on the files for the first job. Assume that the job management server jms receives the above-described request. In this case, the job management server jms refers to the staging-metadata-update-order restriction management table 526 to determine whether or not preceding metadata processing is to be performed before the metadata processing on the files for the first job. If it is determined that preceding metadata processing is to be performed before the metadata processing on the files for the first job, the job management server jms transmits, to the metadata server mds, information for specifying the preceding metadata processing that is to be performed in advance. The information for specifying the preceding metadata processing is, for example, the job ID of the preceding metadata processing. When the metadata server mds receives information for specifying the preceding metadata processing, the preceding metadata processing is performed before the metadata processing on the files for the first job.

FIG. 6 illustrates an exemplary job-resources reservation management table. The job-resources reservation management table 521 illustrated in FIG. 6 includes records 601 to 603.

The job-resources reservation management table 521 includes the fields of the job ID, the job name, the processor start-of-use time, the processor group management structure, and the processor end-of-use time. The job ID field stores a job ID serving as an identification number given to identify a job uniquely. The job ID is used as an array index or a search key. The job name field stores the name of the job. The processor start-of-use time field stores information indicating a time at which the job starts to use the processors of computation nodes cn. The processor group management structure field stores a list of the processors of computation nodes cn used by the job. The processor end-of-use time field stores information indicating a time at which the job ends use of the processors of the computation nodes cn.

FIG. 7 illustrates an exemplary staging schedule table. The staging schedule table 522 illustrated in FIG. 7 includes records 701_1 to 701_3, 702, and 703. Each record in the staging schedule table 522 corresponds to the schedule data 104.

The staging schedule table 522 includes the fields of the job ID, the file ID, the file size, the stage-out scheduled time, the stage-out scheduled period, and the ID of a node performing staging.

The job ID field stores a job ID serving as an identification number given to identify a job uniquely. The job ID is used as an array index or a search key. The file ID field stores a file ID serving as an identification number given to uniquely identify a file that is to be staged. The file size field stores the size of the file to be staged. The stage-out scheduled time field stores information indicating a scheduled time at which the file is to be staged out. The stage-out scheduled period field stores information indicating a scheduled period during which the file is to be staged out. The field of the ID of a node performing staging stores identification information of the representative staging server rs or a staging buffer server stg which performs staging. The identification information is, for example, the Internet Protocol (IP) address or the host name of the representative staging server rs or the staging buffer server stg.

The staging schedule table 522 illustrated in FIG. 7 includes the fields of the stage-out scheduled time, the stage-out scheduled period, and the ID of a node performing staging, as the fields related to a stage-out operation. However, this is not limiting. The staging schedule table 522 may include fields related to a stage-in operation, or may include fields related to a stage-out operation and fields related to a stage-in operation.

Figure 8:
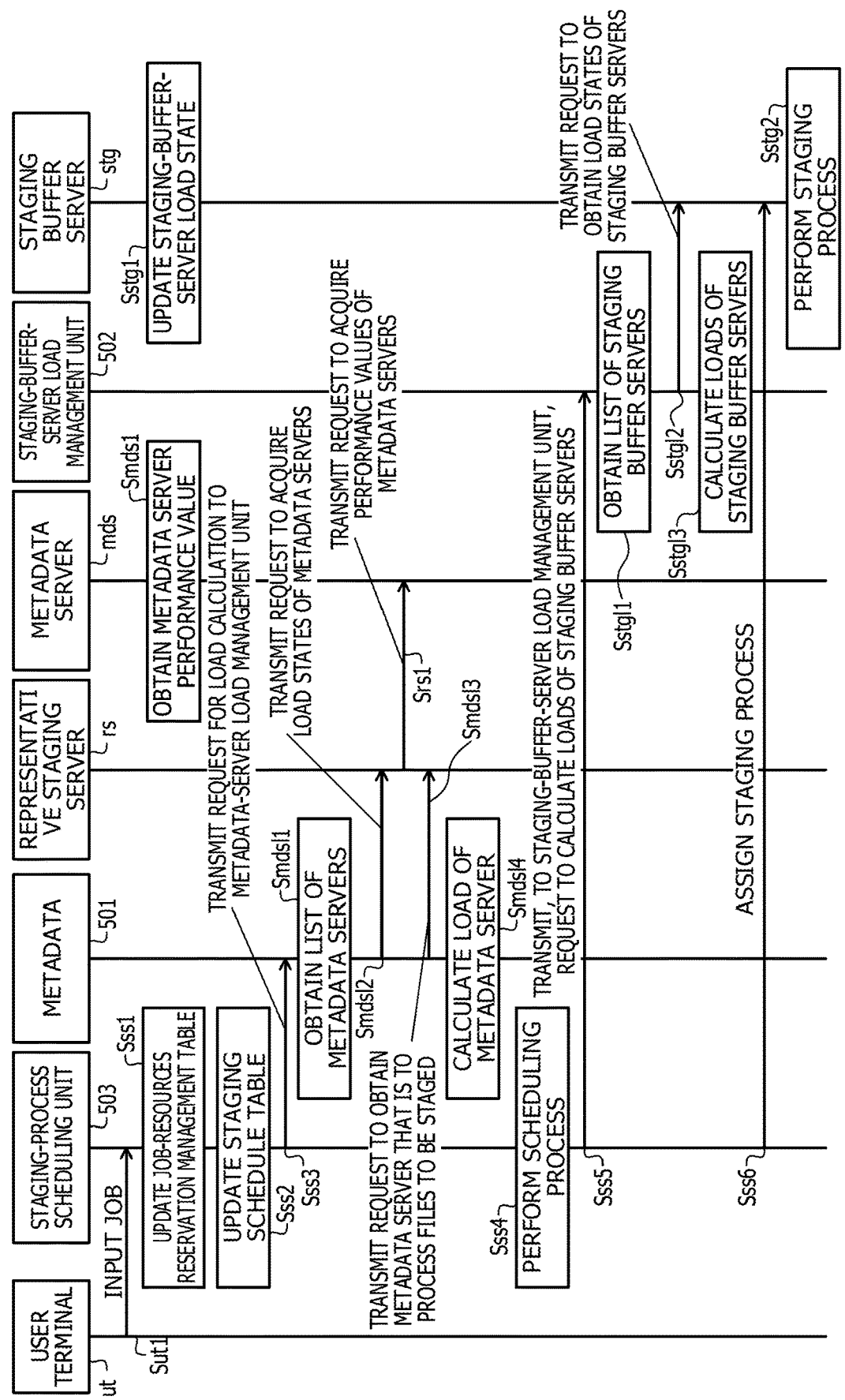
FIG. 8 is a diagram illustrating an exemplary sequence from input of a job to execution of a staging process using a staging buffer server.
Figure 9:
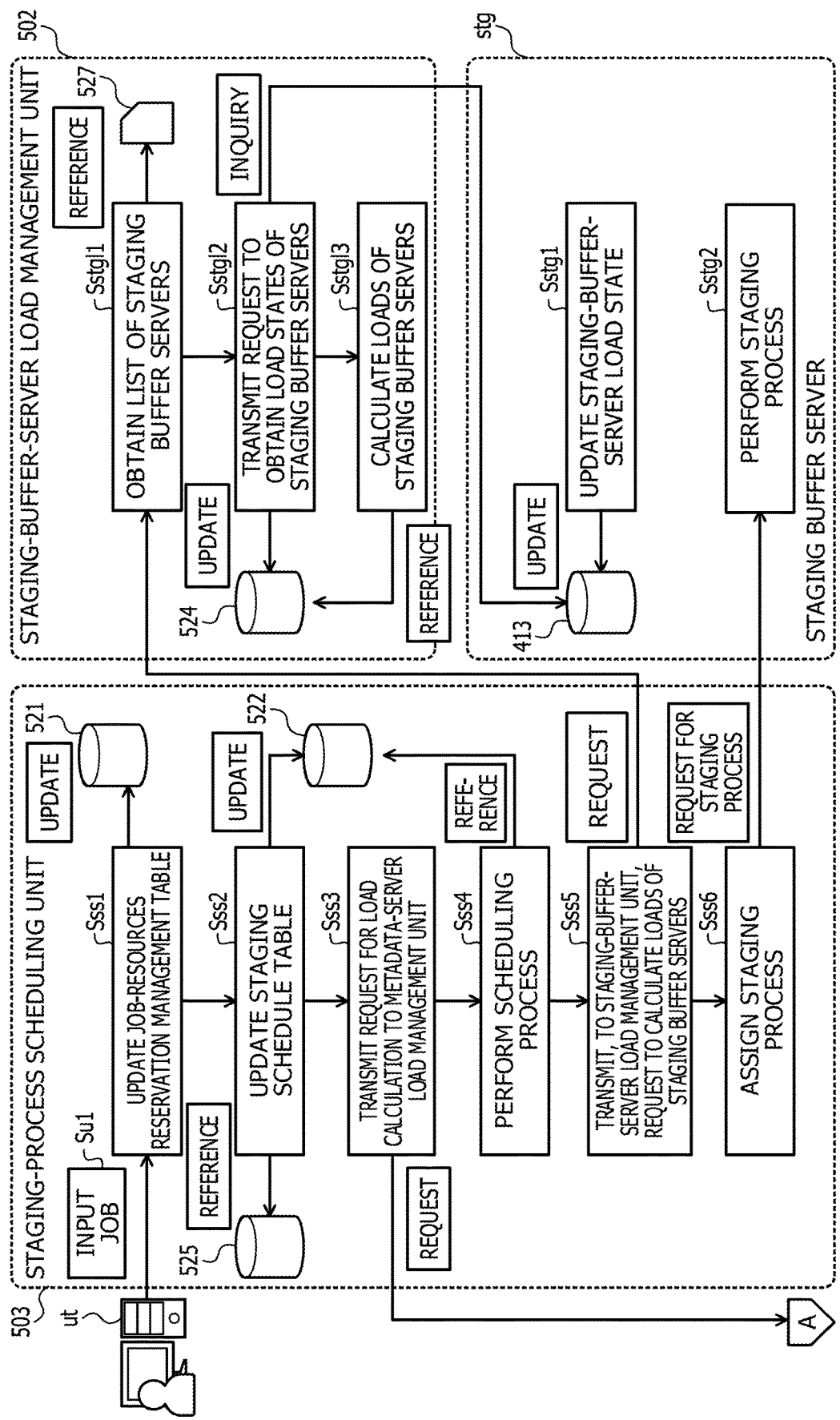
FIG. 9 is a diagram illustrating exemplary processes from input of a job to execution of a staging process using a staging buffer server.
Figure 10:
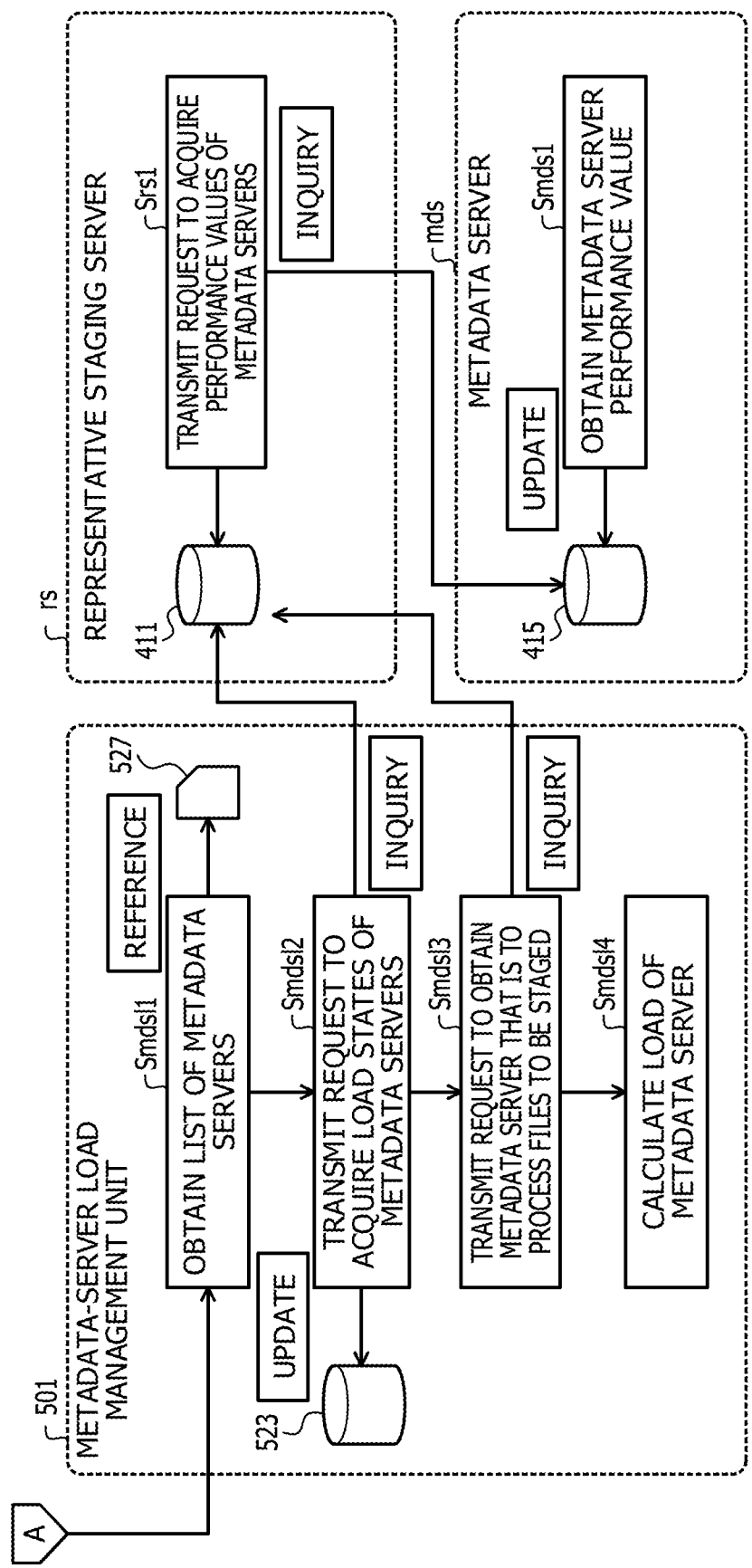
FIG. 10 is a diagram illustrating exemplary processes from input of a job to execution of a staging process using a staging buffer server.

FIGS. 8 to 10 illustrate exemplary processes from input of a job to execution of a staging process using a staging buffer server. FIG. 8 illustrates a sequence of the entire parallel processing system 200. FIGS. 9 and 10 illustrate, with information about data access, the series of processes illustrated in FIG. 8 by rearranging the processes in the process order for each apparatus illustrated in FIG. 2 and for each functional unit of the job management server jms which is illustrated in FIG. 5.

In FIGS. 8 to 10, the step number of a process performed by the user terminal ut is illustrated as "Sutx". The symbol x represents a natural number. The step numbers of processes performed by the representative staging server rs, a staging buffer server stg, and a metadata server mds are illustrated as "Srsx", "Sstgx", and "Smdsx", respectively. Similarly, the step numbers of processes performed by the metadata-server load management unit 501, the staging-buffer-server load management unit 502, and the staging-process scheduling unit 503 are illustrated as "Smdslx", "Sstglx", and "Sssx", respectively.

The user terminal ut inputs a job (step Sut1). The staging-process scheduling unit 503 having received the job input updates the job-resources reservation management table 521 (step Sss1). The staging-process scheduling unit 503 refers to the past-job information DB 525 to update the staging schedule table 522 (step Sss2). After update of the staging schedule table 522, the dependency of a job is determined. Therefore, the staging-process scheduling unit 503 updates the staging-metadata-update-order restriction management table 526 for jobs having dependency. The staging-process scheduling unit 503 transmits, to the metadata-server load management unit 501, a request for load calculation (step Sss3). The staging-process scheduling unit 503 waits for the result of load calculation from the metadata-server load management unit 501.

The metadata-server load management unit 501 having received a request for load calculation refers to the setting file 527 to obtain a list of metadata servers mds (step Smdsl1). The metadata-server load management unit 501 transmits, to the representative staging server rs, an acquisition request to acquire the load states of the metadata servers mds, which serves as an inquiry to the representative staging server rs (step Smdsl2). After transmission of the acquisition request, the metadata-server load management unit 501 obtains the load states stored in the metadata-server load state 411. The metadata-server load management unit 501 updates the metadata-server load management table 523 with the obtained load states.

The representative staging server rs having received the acquisition request transmits, to the metadata servers mds, an acquisition request to acquire the performance values of the metadata servers mds, which serves as an inquiry to the metadata servers mds (step Srs1). After transmission of the acquisition request, the representative staging server rs obtains the performance values stored in the metadata-server performance information 415. The representative staging server rs updates the metadata-server load state 411 with the obtained performance values.

A metadata server mds receiving the acquisition request obtains the metadata server performance value (step Smds1), and updates the metadata-server performance information 415 with the obtained performance value.

The metadata-server load management unit 501 transmits a request to obtain a metadata server that is to process files to be staged, which serves as an inquiry to the representative staging server rs (step Smdsl3).

Then, the metadata-server load management unit 501 calculates the load of the metadata server (step Smdsl4). The metadata-server load management unit 501 transmits the calculated load to the staging-process scheduling unit 503.

The staging-process scheduling unit 503 performs a scheduling process based on the staging schedule table 522 and the load calculated by the metadata-server load management unit 501 (step Sss4). Then, the staging-process scheduling unit 503 transmits, to the staging-buffer-server load management unit 502, a request to calculate the loads of the staging buffer servers stg (step Sss5).

The staging-buffer-server load management unit 502 having received the request to calculate the loads of the staging buffer servers stg refers to the setting file 527 to obtain a list of the staging buffer servers stg (step Sstgl1). The stagingbuffer-server load management unit 502 transmits a request to obtain the load states of the staging buffer servers stg, which serves as an inquiry to the staging buffer servers stg (step Sstgl2). After transmission of the request to obtain the load states, the staging-buffer-server load management unit 502 obtains the load states of the staging buffer servers stg from the staging-buffer-server load states 413. The staging-buffer-server load management unit 502 updates the staging-buffer-server load management table 524 with the obtained load states.

A staging buffer server stg receiving the request to obtain the load state updates the staging-buffer-server load state 413 (step Sstg1).

The staging-buffer-server load management unit 502 refers to the staging-buffer-server load management table 524 to calculate the loads of the staging buffer servers (step Sstgl3). The staging-buffer-server load management unit 502 transmits the calculated loads to the staging-process scheduling unit 503.

The staging-process scheduling unit 503 assigns the staging process based on the loads calculated by the staging-buffer-server load management unit 502 (step Sss6).

A staging buffer server stg to which the staging process has been assigned performs the staging process (step Sstg2).

The processes performed by the metadata-server load management unit 501 will be described. In step Smdsl1, the metadata-server load management unit 501 obtains a list of the metadata servers mds from the setting file 527 or the like. In step Smdsl1, the metadata-server load management unit 501 obtains the load state of each metadata server mds obtained in step Smdsl1. The metadata-server load management unit 501 stores the obtained information in the metadata-server load management table 523. In step Smdsl3, the metadata-server load management unit 501 asks the representative staging server rs to obtain a metadata server mds that is to process files to be staged.

In step Smdsl4, the metadata-server load management unit 501 calculates the load of the metadata server mds obtained in step Smdsl3, based on the metadata-server load management table 523 and the following information. The information used in the calculation indicates the meta access count in the staging, the process type indicating a stage-in operation or a stage-out operation, the process start time and the process end time in accordance with the process type. These pieces of information are received from the staging-process scheduling unit 503. The load of the metadata server mds may be specifically a CPU usage ratio, a disk I/O amount, or both a CPU usage ratio and a disk I/O amount. The disk I/O amount indicates a meta access count per second in staging. The CPU usage ratio indicates, for example, a value calculated by using Expression (1) described below.

$$\text{The CPU usage ratio} = \text{(the meta access count per second in staging)} \times \text{(the CPU usage ratio of the metadata-server load management table 523)} / \text{(the disk I/O amount of the metadata-server load management table 523)} \quad \text{Expression (1)}$$

Exemplary specific calculation of a CPU usage ratio using Expression (1) will be described by using FIG. 11 in which storage information of the metadata-server load management table 523 is illustrated.

FIG. 11 illustrates an exemplary metadata-server load management table. The metadata-server load management table 523 illustrated in FIG. 11 includes records 1101 to 1103.

The metadata-server load management table 523 includes the fields of the ID, the CPU usage ratio, and the disk I/O amount. The ID field stores an ID for identifying a metadata server mds. The CPU usage ratio field stores the CPU usage ratio of the metadata server mds. The disk I/O amount field stores a value indicating the disk I/O amount of the metadata server mds. The unit ops in the disk I/O amount field stands for "operations per second", and indicates the number of operations per second.

Exemplary calculation of a CPU usage ratio will be described by using FIG. 11. Assume that the ID of the metadata server mds obtained in step Smdsl3 is mds_00. Assume that the meta access count produced during a staging period of 10 minutes is 500000. Therefore, meta access of 500000/600≈800 is produced per second. From the record 1101 illustrated in FIG. 11, when the metadata server mds having an ID of mds_00 operates with a disk I/O amount of 1505 ops, the CPU usage ratio is 13.0%. Therefore, from the metadata-server load management table 523, the CPU usage ratio is calculated according to Expression (1) as follows.

$$\text{The CPU usage ratio} = 800 \times 13/1505 \approx 7.0\%$$

The processes of the staging-buffer-server load management unit 502 will be described. In step Sstgl1, the staging-buffer-server load management unit 502 obtains a list of the staging buffer servers stg from the setting file 527 or the like. In step Sstgl1, the staging-buffer-server load management unit 502 asks each staging buffer server stg, which is obtained in step Sstgl1, to obtain the load state of the staging buffer server stg. The staging-buffer-server load management unit 502 stores the obtained information in the staging-buffer-server load management table 524.

In step Sstgl3, the staging-buffer-server load management unit 502 calculates the staging buffer servers stg's loads that are to be produced in the staging process, based on the staging-buffer-server load management table 524 and the following information. The staging buffer servers stg that are to be subjected to the calculation are the staging buffer servers stg obtained in step Sstgl1. The information used in the calculation indicates the meta access count in the staging, the process type indicating a stage-in operation or a stage-out operation, and the process start time and the process end time in accordance with the process type. These pieces of information are received from the staging-process scheduling unit 503. The load of a staging buffer server stg is a CPU usage ratio. The CPU usage ratio is calculated, for example, by using Expression (2) as described below.

$$\text{The CPU usage ratio} = \text{(the meta access count per second in staging)} \times \text{(the CPU usage ratio of the staging-buffer-server load management table 524)} / \text{(the meta access count of the staging-buffer-server load management table 524)} \quad \text{Expression (2)}$$

The load of a staging buffer server stg does not necessarily include the disk I/O amount. The reason why the load of a staging buffer server stg does not include the disk I/O amount is that, in the staging process, the disk of the staging buffer server stg is not accessed.

By using storage information of the staging-buffer-server load management table 524 illustrated in FIG. 12, exemplary specific calculation of a CPU usage ratio using Expression (2) will be described.

FIG. 12 illustrates an exemplary staging-buffer-server load management table. The staging-buffer-server load management table 524 illustrated in FIG. 12 includes records 1201 to 1203.

The staging-buffer-server load management table 524 includes the fields of the ID, the CPU usage ratio, and the meta access count. The ID field stores an ID with which a staging buffer server stg may be uniquely identified. The CPU usage ratio field stores a value indicating the CPU usage ratio. The meta access count field stores a value indicating the meta access count per second.

In step Sstgl3, assume that the load of a staging buffer server stg having an ID of sstg_svr_00 is to be calculated. In addition, assume that the meta access count produced during a staging period of 10 minutes is 500000. Therefore, the meta access of 500000/600≈800 is produced per second. From the record 1201, when the staging buffer server stg having an ID of sstg_svr_00 has a meta access count of 813 ops, the CPU usage ratio is 3.0%. Thus, the staging-buffer-server load management unit 502 calculates the CPU usage ratio produced in the staging process, according to Expression (2) as described below.

The CPU usage ratio=800×3/813≈3.0%

The processes of the staging-process scheduling unit 503 will be described. In step Sss1, the staging-process scheduling unit 503 determines processors that are to be used for the input job, and the start-of-use time and the start-of-end time of the processors, based on the execution period specified by a user and the job-resources reservation management table 521. The staging-process scheduling unit 503 updates the job-resources reservation management table 521 with the information obtained through the determination.

By using the job-resources reservation management table 521 illustrated in FIG. 6, an exemplary specific process in step Sss1 will be described. Assume that each computation node cn of the parallel processing system 200 has 64 processors. When a job having a job ID of 141 is input with a condition that the execution period is two hours and that 64 processors are used, the staging-process scheduling unit 503 refers to the resources reservation management table 521 to search for a time at which 64 processors are available. In the example in FIG. 6, 64 processors are available at 15:50. Therefore, the staging-process scheduling unit 503 determines that the processor start-of-use time is to be 15:50, and registers the determination result in the job-resources reservation management table 521.

In step Sss2, the staging-process scheduling unit 503 calculates the stage-in scheduled time and the stage-out scheduled time from the job start time and the job end time which have been determined. The staging-process scheduling unit 503 reflects the calculation result in the staging schedule table 522. At that time, the staging-process scheduling unit 503 calculates the stage-in scheduled time and the stage-out scheduled time based on the past-job information DB 525 owned by the staging-process scheduling unit 503. Exemplary storage information in the past-job information DB 525 is illustrated in FIG. 13. The processes in step Sss2 will be specifically described.

FIG. 13 illustrates an exemplary past-job information DB. The past-job information DB 525 illustrated in FIG. 13 includes records 1301 to 1303.

The past-job information DB 525 includes the fields of the job ID, the job name, the job start date and time, and the job end date and time. The past-job information DB 525 further includes the fields of the number of utilized processors, the file ID, the stage-out start date and time, the stage-out end date and time, and the stage-out meta access count.

The job ID field stores a job ID serving as an identification number given to identify a job uniquely. The job name field stores the name of the job. The job start date and time field stores information indicating the date and time at which execution of the job was started. The job end date and time field stores information indicating the date and time at which execution of the job was ended. The field of the number of utilized processors stores the number of processors that were used by the job. The file ID field stores an identification number given to uniquely identify a file that was to be staged. The stage-out start date and time field stores information indicating the date and time at which the stage-out operation was started. The stage-out end date and time field stores information indicating the date and time at which the stage-out operation was ended. The stage-out meta access count field stores the metadata access count that was produced during the stage-out operation.

The past-job information DB 525 illustrated in FIG. 13 includes the fields of the stage-out start date and time, the stage-out end date and time, and the stage-out meta access count, as fields related to a stage-out operation. However, this is not limiting. The past-job information DB 525 may include fields related to a stage-in operation, or may include fields related to a stage-out operation and fields related to a stage-in operation.

In step Sss2, the staging-process scheduling unit 503 obtains, from the past-job information DB 525, information about a job of which the job name is the same as the name of the input job, and for which the number of utilized processors is the same as that for the input job. From the stage-out start date and time and the stage-out end date and time of the obtained job information, the staging-process scheduling unit 503 calculates a period from start of the execution of the job to start of the stage-out operation, and a period during which the stage-out operation was performed. The staging-process scheduling unit 503 uses the calculated periods in calculation of the scheduled times of the stage-in and stage-out operations of the job determined in step Sss1.

Exemplary calculation of a stage-in scheduled time and a stage-out scheduled time for a job having a job ID of 135 in the job-resources reservation management table 521 will be described. From the record 601, the job name of a job having a job ID of 135 is "Job A", and 48 processors will be used. The staging-process scheduling unit 503 searches the past-job information DB 525 by using "job name: Job A" and "the number of utilized processors: 48" as keys. The staging-process scheduling unit 503 determines that a job which has a job ID of 11 and which is indicated in the record 1301 is a similar job. As illustrated in the record 1301, the job having a job ID of 11 started the stage-out operation at 12:15, 40 minutes after the 11:35 job start time.

Therefore, the staging-process scheduling unit 503 updates the staging schedule table 522 so that the stage-out scheduled time in the staging schedule table 522 is set to 15:40, 40 minutes after the processor start-of-use time in the record 601. The stage-out scheduled period indicates the difference between the stage-out start date and time and the stage-out end date and time in the past-job information DB 525.

In step Sss3, the staging-process scheduling unit 503 transmits, to the metadata-server load management unit 501, a request for load calculation for a metadata server mds. For example, when the staging-process scheduling unit 503 is to obtain the load at the stage-out scheduled time, the staging-process scheduling unit 503 transmits a request for load calculation. The request includes, as arguments, the metadata access count at the stage-out scheduled time and the stage-out scheduled period which are calculated in step Sss2. When the staging-process scheduling unit 503 is to obtain the load at the stage-in scheduled time, the staging-process scheduling unit 503 transmits a request for load calculation. The request includes, as arguments, the metadata access count at the stage-in scheduled time and the stage-in scheduled period which are calculated in step Sss2.

In the example of the staging schedule table 522, it is found that files on which a stage-out operation will start at 15:40 are three files handled by the job having a job ID of 135, and that the stage-out scheduled period will be nine minutes. The staging-process scheduling unit 503 transmits, to the metadata-server load management unit 501, the number of files on which a stage-out operation will start, as the meta access count, and the stage-out scheduled period. The staging-process scheduling unit 503 transmits the meta access count and the stage-out scheduled period so as to obtain the CPU usage ratio and the disk I/O amount which may be produced in a metadata server mds.

In step Sss4, the staging-process scheduling unit 503 obtains the load of the metadata server mds obtained in step Sss3, for all of the jobs in which a stage-out process is performed. The load of the metadata server mds indicates the amount of metadata processing. Then, the staging-process scheduling unit 503 determines whether or not the total of the loads produced by the jobs, for each of which a stage-out process is to be performed in the metadata server mds, exceeds the given threshold that is set by an administrator of the parallel processing system 200. When the above-described total exceeds the given threshold, the staging-process scheduling unit 503 makes a schedule so that a staging buffer server stg performs some or all of the staging processes.

In step Sss4, assume that two jobs having job IDs of 1 and 2 will be being done on the parallel distributed file system 201. Based on the load of the metadata server mds obtained in step Sss3, the staging-process scheduling unit 503 calculates the totals of the CPU usage ratios and the disk I/O amounts of the metadata servers for the jobs that will be being done, at every sampling interval. The sampling interval may be set to any value by an administrator of the parallel processing system 200.

Figure 14:
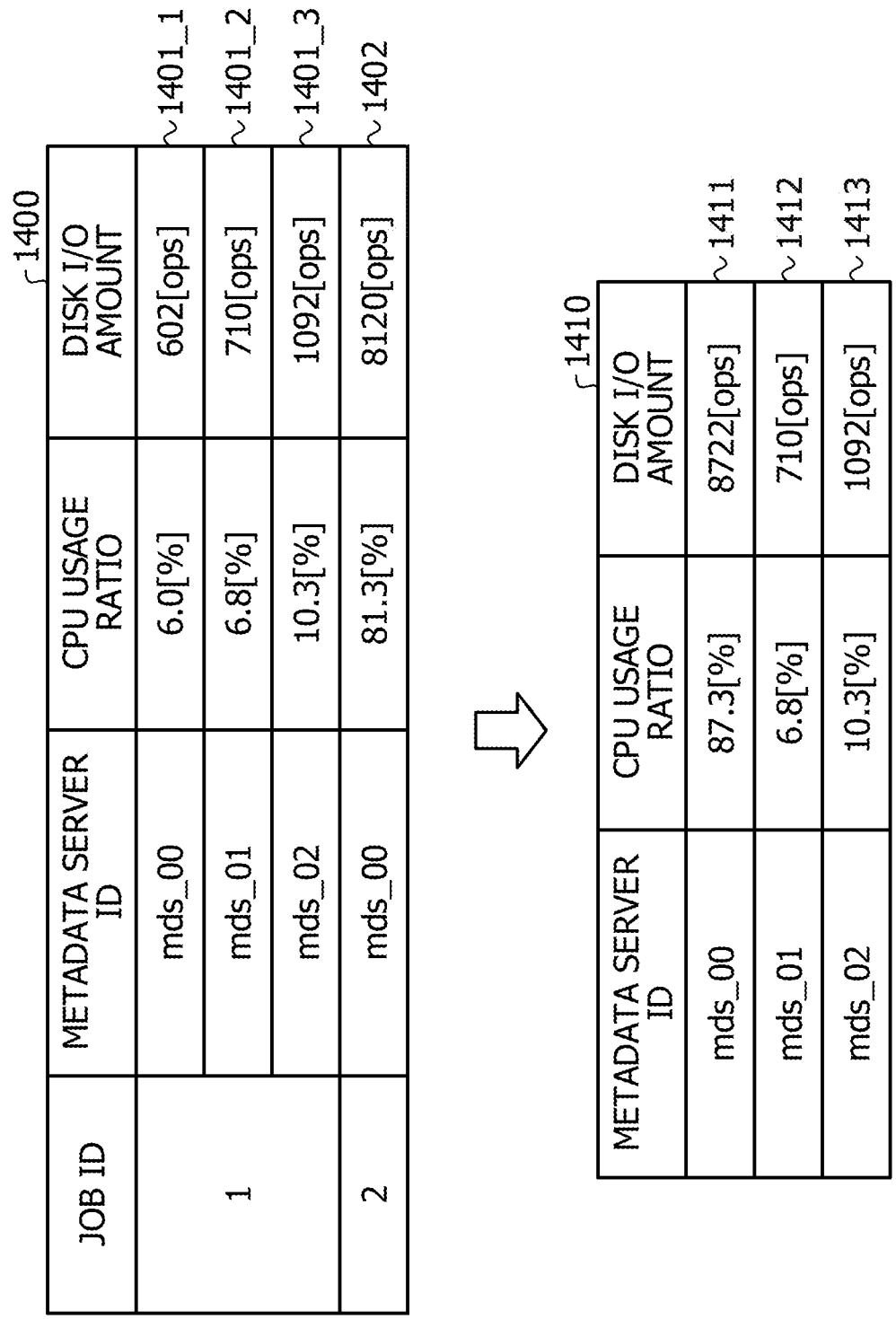
FIG. 14 is a diagram illustrating an example of CPU usage ratios and disk input/output (I/O) amounts which are produced in metadata servers.

FIG. 14 illustrates an example of CPU usage ratios and disk I/O amounts which will be produced in the metadata servers. A table 1400 illustrated in an upper portion of FIG. 14 illustrates CPU usage ratios and disk I/O amounts which will be produced in metadata servers from 12:00 to 12:01. The table 1400 illustrated in the upper portion of FIG. 14 includes records 1401_1 to 1401_3 and 1402.

The staging-process scheduling unit 503 calculates, based on the table 1400, the CPU usage ratio and the disk I/O amount which may be produced in each metadata server mds, and obtains a table 1410 illustrated in a lower portion of FIG. 14. The table 1410 illustrated in the lower portion of FIG. 14 includes records 1411 to 1413.

Assume that the threshold of the CPU usage ratio which is set by an administrator of the parallel processing system 200 is 80%, and that the threshold of the disk I/O amount is 10000 ops. From 12:00 to 12:01, the CPU usage ratio produced in the metadata server mds having an ID of mds_00 will be 87.3%, which exceeds the threshold of the CPU usage ratio which is set by the administrator of the parallel processing system 200. Therefore, the staging-process scheduling unit 503 determines that the stage-out process for the job having a job ID of 2 is to be temporarily transferred to a staging buffer server stg.

The target of the process in step Sss5 is the stage-out process determined in step Sss4. The staging-process scheduling unit 503 transmits, to the staging-buffer-server load management unit 502, the meta access count and the stage-out scheduled period which are obtained in step Sss2. By transmitting the meta access count and the stage-out scheduled period, the staging-process scheduling unit 503 obtains the CPU usage ratio obtained if the target stage-out process is performed by each staging buffer server stg.

An exemplary specific process in step Sss5 is a process in which the stage-out process in the job having a job ID of 2 is determined to be temporarily transferred to a staging buffer server stg. In step Sss5, the staging-process scheduling unit 503 transmits, to the staging-buffer-server load management unit 502, the meta access count and the stage-out scheduled period. The CPU usage ratios obtained through transmission of the meta access count and the stage-out scheduled period are illustrated in FIG. 15.

FIG. 15 illustrates exemplary CPU usage ratios produced in the staging buffer servers. A table 1500 illustrated in FIG. 15 includes records 1501 to 1503. The table 1500 illustrates exemplary CPU usage ratios which will be produced in the staging buffer servers from 12:00 to 12:01 during which the stage-out process determined to be temporarily transferred to a staging buffer server stg is executed.

In step Sss6, the staging-process scheduling unit 503 transmits a request to perform the staging process determined in step Sss4, to a staging buffer server stg having the lowest CPU usage ratio.

An exemplary specific process in step Sss6 will be described by using the example in FIG. 15. The staging-process scheduling unit 503 transmits a request to perform the stage-out process, to the staging buffer server stg, having an ID of sstg_svr_02, which has the lowest CPU usage ratio.

In step Sstg1, a staging buffer server stg obtains its CPU usage ratio and its disk I/O amount, and stores the obtained information in the staging-buffer-server load state 413. The staging-buffer-server load state 413 will be described by using FIG. 16.

FIG. 16 illustrates an exemplary staging-buffer-server load state. The staging-buffer-server load state 413 illustrated in FIG. 16 includes a record 1601. The staging-buffer-server load state 413 includes the CPU usage ratio and the meta access count. The CPU usage ratio field stores the CPU usage ratio of the staging buffer server stg obtained at a time point of acquisition of the load state. The meta access count field stores the meta access count of the staging buffer server stg obtained at the time point of acquisition of the load state.

In step Sstg2, the staging buffer server stg performs the staging process that has been put on hold. Specifically, the staging buffer server stg asks the representative staging server rs about the load state of the metadata server mds, and performs the staging process that has been put on hold. At that time, in response to the staging request, the staging buffer server stg makes a setting so that the above-described staging process occurs at a time at which the load of the metadata server mds does not exceed the threshold of the CPU usage ratio which is set by the administrator of the parallel processing system 200.

The staging buffer server stg asks the representative staging server rs, and sets the execution start time of the staging process to a time at which the result obtained by adding the CPU usage ratio produced in the metadata server mds to that for the staging process does not exceed the above-described threshold of the CPU usage ratio. The reason why the staging buffer server stg refers to the CPU usage ratio of the metadata server mds is that, when the staging buffer server stg performs the staging process, a process occurs in the metadata server mds. FIG. 17 illustrates exemplary CPU usage ratios of the metadata servers mds at each time.

FIG. 17 illustrates exemplary CPU usage ratios of metadata servers at each time. A table 1700 illustrated in FIG. 17 illustrates the CPU usage ratio of the metadata server mds having an ID of mds_00 and that of the metadata server mds having an ID of mds_01 at each time. The table 1700 illustrated in FIG. 17 includes records 1701 to 1704.

In the exemplary specific process in step Sstg2, assume that, as in the table 1700 illustrated in FIG. 17, the CPU usage ratios of the metadata servers mds at each time are obtained from the representative staging server rs. In addition, assume that, through calculation, it is found that the staging process causes the CPU usage ratio of a metadata server mds to increase by 40%. Further, assume that it has been determined that the staging process is to be performed in the metadata server mds having an ID of mds_00. At that time, based on FIG. 17, the staging buffer server stg performs the staging process on the metadata server mds having an ID of mds_00, from 12:04 to 12:05.

In step Smds1, in response to an inquiry from the representative staging server rs, each metadata server mds transmits its performance value and a file identifier.

A process performed when an order restriction is present occurs when files having dependency in metadata processing are used. For example, assume that two staging processes of a staging process A and a staging process B which are included in metadata processing are present, and that originally the staging process A and the staging process B are to be performed in this order. An example under such assumptions is such that, when the file path of the staging process A is included in a file accessed in the staging process B, the staging process A is to be performed before execution of the staging process B.

Figure 18:
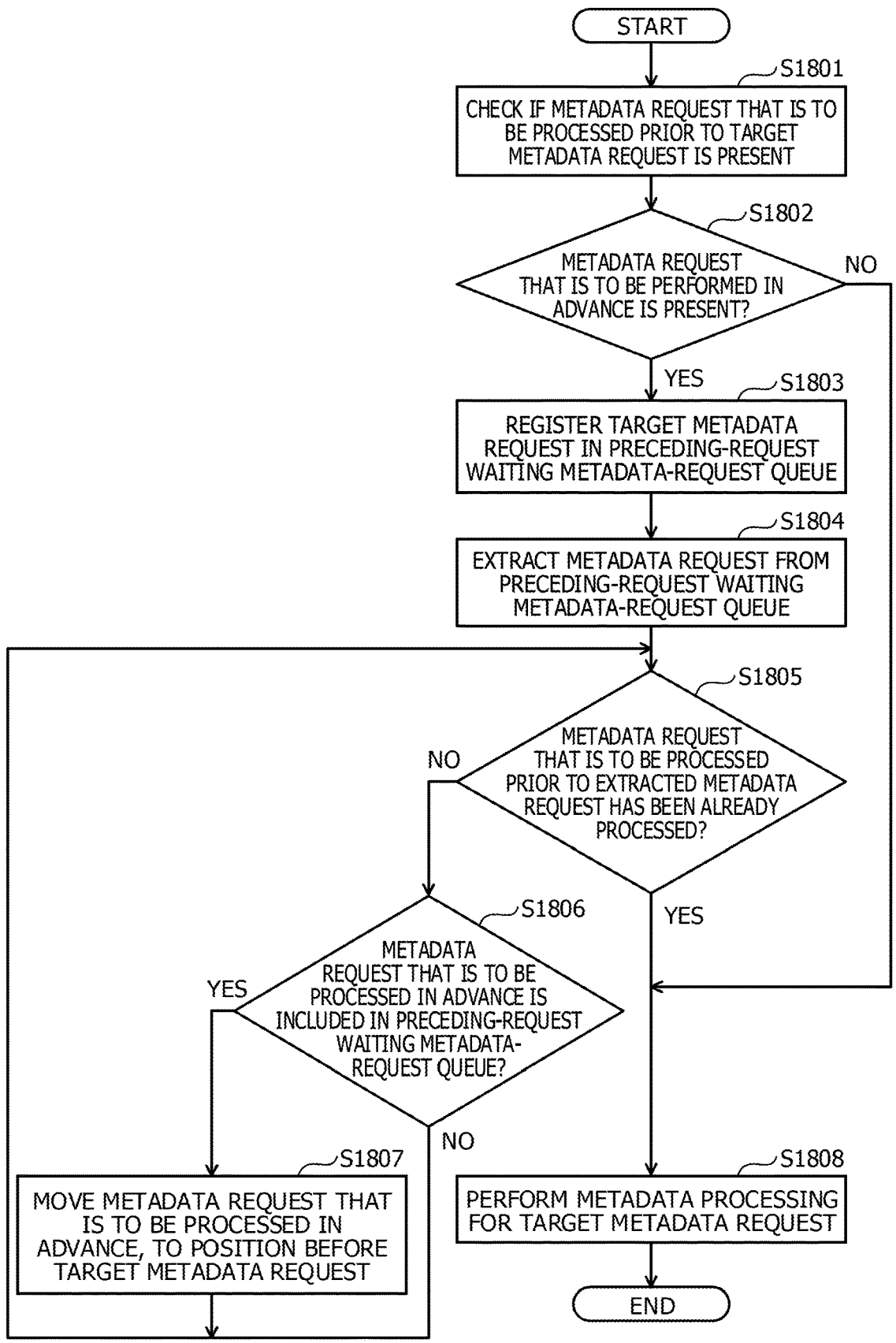
FIG. 18 is a diagram illustrating exemplary processes performed when a data order restriction is present between pieces of data to be staged.

FIG. 18 illustrates exemplary processes performed when a restriction is present in the order of pieces of data that are to be staged. A metadata server mds checks if a metadata request that is to be processed prior to the target metadata request is present (step S1801). For example, each metadata server mds asks the staging-process scheduling unit 503, and checks if a metadata request that is to be processed in advance is present.

The metadata server mds determines whether or not a metadata request that is to be performed in advance is present (step S1802). If a metadata request that is to be processed in advance is present (Yes in step S1802), the metadata server mds registers the target metadata request in the preceding-request waiting metadata-request queue 414 (step S1803). Then, the metadata server mds extracts a metadata request from the preceding-request waiting metadata-request queue 414 (step S1804).

The metadata server mds determines whether or not a metadata request that is to be processed prior to the extracted metadata request has been already processed (step S1805). If a metadata request that is to be processed prior to the extracted metadata request has not been processed (No in step S1805), the metadata server mds determines whether or not the metadata request that is to be processed in advance is included in the preceding-request waiting metadata-request queue 414 (step S1806). If the metadata request that is to be processed in advance is included in the preceding-request waiting metadata-request queue 414 (Yes in step S1806), the metadata server mds moves the metadata request that is to be processed in advance, to a position before the target metadata request (step S1807). If the process in step S1807 is completed, or if the metadata request is not included in the preceding-request waiting metadata-request queue 414 (No in step S1806), the metadata server mds proceeds the process to step S1805.

If a metadata request that is to be processed in advance is not present (No in step S1802), or if the metadata request that is to be processed prior to the extracted metadata request has been processed (Yes in step S1805), the metadata server mds performs metadata processing for the target metadata request (step S1808). After completion of step S1808, the metadata server mds ends the series of processes.

FIG. 19 illustrates an exemplary staging-metadata-update-order restriction management table. The staging-metadata-update-order restriction management table 526 illustrated in FIG. 19 includes records 1901 to 1904.

The staging-metadata-update-order restriction management table 526 includes the fields of the job ID and the dependent job. The job ID field stores a value indicating the job ID serving as an identifier of the job in which a metadata request including a staging process is processed. The dependent job field stores a job ID serving as the identifier of a job in which, for the staging process, a staging process on which the metadata processing depends is performed.

For example, the record 1901 indicates that a metadata request that is to be processed in advance is present in a metadata request for the staging process of the job having a job ID of 12. The metadata request that is to be processed in advance is included in a staging process of a job having a job ID of 8. Therefore, until the staging process of the job having a job ID of 8 is completed, the metadata server mds puts, on hold, the staging process of the job having a job ID of 12.

As described above, for a stage-out operation, the job management server jms obtains the execution end time of a job from the job execution history. When the load of the metadata server at the obtained time is high, the job management server jms causes a staging buffer server to perform a stage-out operation at the obtained time. Thus, the job management server jms finds a time at which load concentration in a metadata server mds is highly likely to occur, enabling the load of the metadata server mds to be suppressed.

The job management server jms may determine, from the job scheduling result, the number of files that are to be staged out at the execution end time, and may obtain the metadata server mds' load corresponding to the determined number of files. Thus, the job management server jms obtains the load of the metadata server mds at the execution end time by using the number of files that are to be staged out for certain in the future. Therefore, compared with the case in which only past loads of the metadata server mds are used, the job management server jms may obtain the load of the metadata server mds at the execution end time with higher accuracy. In addition, the job management server jms may decrease the probability of occurrence of the following case. When the load of the metadata server mds at the execution end time actually exceeds a given threshold, the job management server jms erroneously determines that the load does not exceed the given threshold, and causes the metadata server mds to perform the staging process.

The job management server jms may calculate the stage-out scheduled period of a job, and may determine the number of files that are to be staged out in the stage-out scheduled period. Then, the job management server jms may obtain the metadata server mds' load per unit time which corresponds to the number of files. Thus, even when the stage-out scheduled period is a certain period of time, the job management server jms may suppress the load of the metadata server mds.

For a stage-in operation, the job management server jms obtains the job execution start time from the job scheduling result. When the load of the metadata server at the obtained time is high, the job management server jms causes a staging buffer server to perform the stage-in operation at the obtained time. Thus, the job management server jms finds a time at which load concentration in the metadata server mds is highly likely to occur, enabling the load of the metadata server mds to be suppressed.

In execution of metadata processing on a file related to a job, the metadata server mds transmits, to the job management server jms, a request to check if metadata processing that is to be performed prior to the metadata processing on the file related to the job is present. Thus, the parallel processing system 200 may also correctly perform metadata processing having dependency.

The job management server jms may determine a staging buffer server stg that is made to perform the staging process, among the multiple staging buffer servers stg based on the loads of the staging buffer servers stg. Thus, the job management server jms may distribute the load among the staging buffer servers stg.

The parallel processing method is implemented by executing a program prepared in advance, on a computer, such as a personal computer or a workstation. The parallel processing program is executed by recording the parallel processing program in a computer-readable recording medium, such as a hard disk, a flexible disk, a compact disc-read only memory (CD-ROM), or a digital versatile disk (DVD), and reading the parallel processing program from the recording medium by using the computer. The parallel processing program may be distributed over a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a processor; and
a memory coupled to the processor,
the information processing apparatus is provided as a job management node in a system including a plurality of nodes,
the processor performs a scheduling process of scheduling a job for the plurality of nodes, the scheduling process including:
calculating, when a computation node of the plurality of nodes executes a first job, a job execution end time when execution of the first job is completed by referring an execution history in which an execution time of a job is recorded;
acquiring, from a load management node that is included in the plurality of nodes and manages a load of a metadata-process execution node which is included in the plurality of nodes and performs metadata processing to access metadata of a file among the plurality of nodes, the load of the metadata-process execution node at the job execution end time; and
generating, when the load is equal to or more than a threshold, schedule data to cause a staging execution node, which is included in the plurality of nodes and is different from the metadata-process execution node, to perform the metadata processing which is produced by a staging process in which a file having an execution result of the first job is moved between the computation node and a node which is included in the plurality of nodes and stores user data at the job execution end time.

2. The information processing apparatus according to claim 1, wherein the load management node includes load information indicating the load of the metadata-process execution node corresponding to a number of files which are subjected to the metadata processing, and the scheduling process refers to schedule information indicating a scheduled time at which the staging process is to be performed on each of the files, determines a number of target files which are to be moved at the job execution end time, and transmits the number of target files to the load management node.

3. The information processing apparatus according to claim 2, wherein the scheduling process obtains, from the load management node, the load of the metadata-process execution node corresponding to the number of target files which is obtained by referring to the load information as the load of the metadata-process execution node at the job execution end time.

4. The information processing apparatus according to claim 3, wherein the execution history includes a time at which execution of the job is started, a staging execution start time at which the staging process of a file having an execution result of the job is started, and a staging execution end time of the staging process of the file, the scheduling process:
calculates, in execution of the first job, the staging execution start time and the staging execution end time for the file having the execution result of the first job by referring to the execution history;
determines the number of target files which are to be moved from the staging execution start time to the staging execution end time by referring to the schedule information; and
transmits, to the load management node, the number of target files and information indicating a period from the staging execution start time to the staging execution end time.

5. The information processing apparatus according to claim 4, wherein the scheduling process:
receives, from the load management node, a load per unit time of the metadata-process execution node which is calculated based on the period and corresponds to the number of target files by referring to the load information; and
generates, when the load per unit time is equal to or more than a threshold, the schedule data.

6. The information processing apparatus according to claim 1, wherein the scheduling process:
calculates, before one of the plurality of nodes performs the first job, a job execution start time at which execution of the first job is started based on information indicating a time at which the first job starts to use the node;
obtains, from the load management node, a load of the metadata-process execution node at the job execution start time; and
generates, when the load is equal to or more than the threshold, the schedule data which causes the staging execution node perform, at the job execution start time, the metadata processing based on staging of a file referred to by the first job or updated by the first job.

7. The information processing apparatus according to claim 1, wherein the scheduling process:
  receives, in execution of the metadata processing on the file related to the first job, a request to check whether the metadata processing to be performed prior to the metadata processing on a file related to the first job is present from the metadata-process execution node;
  refers to order information indicating an order in which the metadata processing is performed on the file related to the job; and
  transmits, when the metadata processing to be performed prior to the metadata processing on the file related to the first job is present, information for specifying the metadata processing to be performed prior to the metadata processing on the file related to the first job to the metadata-process execution node.

8. The information processing apparatus according to claim 7, wherein the metadata-process execution node, when the information for specifying the metadata processing to be performed prior to the metadata processing on the file related to the first job to the metadata-process execution node is received, performs the metadata processing to be performed prior to the metadata processing on the file related to the first job to the metadata-process execution node prior to the metadata processing on the file related to the first job.

9. The information processing apparatus according to claim 1, wherein the plurality of nodes include a plurality of candidate nodes which each serves as the staging execution node, and the scheduling process:
  obtains, when the load is equal to or more than the threshold, a load of each of the candidate nodes at the job execution end time from the load management node; and
  determines the staging execution node from the plurality of candidate nodes based on the loads of the plurality of candidate nodes.

10. A stage-out processing method comprising:
  calculating, by a computer which is provided as a job management node in a system including a plurality of nodes, when a computation node of the plurality of nodes executes a first job, a job execution end time when execution of the first job is completed by referring an execution history in which an execution time of a job is recorded;
  acquiring, from a load management node that is included in the plurality of nodes and manages a load of a metadata-process execution node which is included in the plurality of nodes and performs metadata processing to access metadata of a file among the plurality of nodes, the load of the metadata-process execution node at the job execution end time; and
  generating, when the load is equal to or more than a threshold, schedule data to cause a staging execution node, which is included in the plurality of nodes and is different from the metadata-process execution node, to perform the metadata processing which is produced by a staging process in which a file having an execution result of the first job is moved between the computation node and a node which is included in the plurality of nodes and stores user data at the job execution end time.

11. The stage-out processing method according to claim 10, wherein the load management node includes load information indicating the load of the metadata-process execution node corresponding to a number of files which are subjected to the metadata processing, and the stage-out processing method further includes:
  referring to schedule information indicating a scheduled time at which the staging process is to be performed on each of the files;
  determining a number of target files which are to be moved at the job execution end time; and
  transmitting the number of target files to the load management node.

12. The stage-out processing method according to claim 11, further comprising:
  obtaining, from the load management node, the load of the metadata-process execution node corresponding to the number of target files which as obtained by referring to the load information is the load of the metadata-process execution node at the job execution end time.

13. The stage-out processing method according to claim 10, further comprising:
  calculating, before one of the plurality of nodes performs the first job, a job execution start time at which execution of the first job is started based on information indicating a time at which the first job starts to use the node;
  obtaining, from the load management node, a load of the metadata-process execution node at the job execution start time; and
  generating, when the load is equal to or more than the threshold, the schedule data which causes the staging execution node perform, at the job execution start time, the metadata processing based on staging of a file referred to by the first job or updated by the first job.

14. The stage-out processing method according to claim 10, further comprising:
  receiving, in execution of the metadata processing on the file related to the first job, a request to check whether the metadata processing to be performed prior to the metadata processing on a file related to the first job is present from the metadata-process execution node;
  referring to order information indicating an order in which the metadata processing is performed on the file related to the job; and
  transmitting, when the metadata processing to be performed prior to the metadata processing on the file related to the first job is present, information for specifying the metadata processing to be performed prior to the metadata processing on the file related to the first job to the metadata-process execution node.

15. The stage-out processing method according to claim 10, wherein the plurality of nodes include a plurality of candidate nodes which each serves as the staging execution node, and the stage-out processing method further includes:
  obtaining, when the load is equal to or more than the threshold, a load of each of the candidate nodes at the job execution end time from the load management node; and
  determining the staging execution node from the plurality of candidate nodes based on the loads of the plurality of candidate nodes.

16. The non-transitory computer-readable recording medium according to claim 10, wherein the plurality of nodes include a plurality of candidate nodes which each serves as the staging execution node, and the stage-out processing method further includes:

obtaining, when the load is equal to or more than the threshold, a load of each of the candidate nodes at the job execution end time from the load management node; and determining the staging execution node from the plurality of candidate nodes based on the loads of the plurality of candidate nodes.

17. A non-transitory computer-readable recording medium recording a job management program which causes a computer to perform a process, the process comprising:

calculating, by the computer which is provided as a job management node in a system including a plurality of nodes, when a computation node of the plurality of nodes executes a first job, a job execution end time when execution of the first job is completed by referring an execution history in which an execution time of a job is recorded;

acquiring, from a load management node that is included in the plurality of nodes and manages a load of a metadata-process execution node which is included in the plurality of nodes and performs metadata processing to access metadata of a file among the plurality of nodes, the load of the metadata-process execution node at the job execution end time; and generating, when the load is equal to or more than a threshold, schedule data to cause a staging execution node, which is included in the plurality of nodes and is different from the metadata-process execution node, to perform the metadata processing which is produced by a staging process in which a file having an execution result of the first job is moved between the computation node and a node which is included in the plurality of nodes and stores user data at the job execution end time.

18. The non-transitory computer-readable recording medium according to claim 17, wherein the load management node includes load information indicating the load of the metadata-process execution node corresponding to a number of files which are subjected to the metadata processing, and the stage-out processing method further includes:

referring to schedule information indicating a scheduled time at which staging is to be performed on each of the files;

determining a number of target files which are to be staged at the job execution end time; and transmitting the number of target files to the load management node.

19. The non-transitory computer-readable recording medium according to claim 17, further comprising:

calculating, before one of the plurality of nodes performs the first job, a job execution start time at which execution of the first job is started based on information indicating a time at which the first job starts to use the node;

obtaining, from the load management node, a load of the metadata-process execution node at the job execution start time; and generating, when the load is equal to or more than the threshold, the schedule data which causes the staging execution node perform, at the job execution start time, the metadata processing based on staging of a file referred to by the first job or updated by the first job.

20. The non-transitory computer-readable recording medium according to claim 17, further comprising:

receiving, in execution of the metadata processing on the file related to the first job, a request to check whether the metadata processing to be performed prior to the metadata processing on a file related to the first job is present from the metadata-process execution node;

referring to order information indicating an order in which the metadata processing is performed on the file related to the job; and transmitting, when the metadata processing to be performed prior to the metadata processing on the file related to the first job is present, information for specifying the metadata processing to be performed prior to the metadata processing on the file related to the first job to the metadata-process execution node.

* * * * *